United States Patent
Koyama et al.

(10) Patent No.: US 6,964,823 B2
(45) Date of Patent: *Nov. 15, 2005

(54) SOLID POLYMER ELECTROLYTE, A MEMBRANE USING THEREOF, A SOLUTION FOR COATING ELECTRODE CATALYST, A MEMBRANE/ELECTRODE ASSEMBLY, AND A FUEL CELL

(75) Inventors: Toru Koyama, Hitachi (JP); Toshiyuki Kobayashi, Tokai (JP); Kenji Yamaga, Hitachi (JP); Tomoichi Kamo, Tokai (JP); Kazutoshi Higashiyama, Naka (JP)

(73) Assignee: Hitachi, Ltd., Tokyo (JP)

( * ) Notice: Subject to any disclaimer, the term of this patent is extended or adjusted under 35 U.S.C. 154(b) by 10 days.

This patent is subject to a terminal disclaimer.

(21) Appl. No.: 10/641,076

(22) Filed: Aug. 15, 2003

(65) Prior Publication Data

US 2004/0033407 A1 Feb. 19, 2004

Related U.S. Application Data

(63) Continuation of application No. 09/811,746, filed on Mar. 20, 2001, now Pat. No. 6,670,065.

(30) Foreign Application Priority Data

Sep. 29, 2000 (JP) .................................... 2000-301100

(51) Int. Cl.[7] .............................................. H01M 8/10
(52) U.S. Cl. ..................................................... 429/33
(58) Field of Search ............................ 429/29, 33, 314

(56) References Cited

U.S. PATENT DOCUMENTS

| | | | |
|---|---|---|---|
| 4,012,303 A | 3/1977 | D'Agostino et al. | |
| 4,605,685 A | 8/1986 | Momose et al. | |
| 5,403,675 A | 4/1995 | Ogata et al. | |
| 5,741,408 A | 4/1998 | Helmer-Metzmann et al. | |
| 5,989,742 A | 11/1999 | Cabasso et al. | |
| 6,096,234 A | 8/2000 | Nakanishi et al. | |
| 6,103,414 A | 8/2000 | Cabasso et al. | |
| 6,159,389 A | 12/2000 | Miura et al. | |
| 6,180,287 B1 | 1/2001 | Watanabe et al. | |
| 6,201,071 B1 | 3/2001 | Miura et al. | |
| 6,214,488 B1 | 4/2001 | Helmer-Metzmann et al. | |
| 6,245,881 B1 | 6/2001 | Faure et al. | |
| 6,277,514 B1 | 8/2001 | Ying et al. | |
| 6,425,944 B2 | 7/2002 | Faure et al. | |
| 2003/0096149 A1 * | 5/2003 | Koyama et al. | 429/33 |

FOREIGN PATENT DOCUMENTS

| | | |
|---|---|---|
| JP | 52-49298 | 4/1977 |
| JP | 62-269704 | 11/1987 |
| JP | 6-93114 | 4/1994 |
| JP | 09-087510 | 3/1997 |
| JP | 10-503788 | 4/1998 |
| JP | 11-116679 | 4/1999 |
| JP | 11-510198 | 9/1999 |
| JP | 11-515040 | 12/1999 |
| JP | 2001-110428 | 4/2001 |

* cited by examiner

*Primary Examiner*—Patrick Joseph Ryan
*Assistant Examiner*—Melissa Austin
(74) *Attorney, Agent, or Firm*—Antonelli, Terry, Stout & Kraus, LLP

(57) ABSTRACT

A solid polymer electrolyte is made up of a polymer compound having a hydrocarbon aromatic group in the backbone thereof and including a side chain expressed by FORMULA 1:

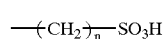

FORMULA 1 wherein "n" is 1, 2, 3, 4, 5, or 6. The solid polymer electrolyte may be incorporated into a membrane and may be used in a solution for covering an electrode catalyst.

17 Claims, 10 Drawing Sheets

SOLID POLYMER ELECTROLYTE, A MEMBRANE USING THEREOF, A SOLUTION FOR COATING ELECTRODE CATALYST, A MEMBRANE/ELECTRODE ASSEMBLY, AND A FUEL CELL

CROSS-REFERENCE TO RELATED FILES

This application is a continuation application of Ser. No. 09/811,746 filed on Mar. 20, 2001, now U.S. Pat. No. 6,670,065, issued Dec. 30, 2003.

BACKGROUND OF THE INVENTION

The present invention relates to a low-cost high-durability and high oxidation-resistant solid polymer electrolyte fit for an electrolyte membrane used for fuel cells, electrolysis of water, electrolysis of halogenated hydracid, electrolysis of salt (solution), oxygen concentrators, humidity sensors, and gas sensors, a solid polymer electrolyte membrane using thereof, a solution for covering electrode catalyst, a membrane/electrode assembly, and a fuel cell.

A solid polymer electrolyte is a solid polymer material having electrolytic groups such as sulfonic groups in polymer chains and has features of strongly bonding to specific ions and selectively permeating cations or anions. The solid polymer electrolyte is formed into particles, fibers or thin films and used for electrodialysis, diffusion dialysis, cell diaphragms, and so on.

A reformed gas fuel cell comprising a cathode, an anode, and a proton conducting solid polymer electrolyte membrane sandwiched between these electrodes supplies a hydrogen gas obtained by reforming hydrocarbons of low molecular weights such as methane and methanol as a fuel gas to one electrode (fuel electrode) and an oxygen gas or air as an oxidizing agent to the other electrode (air electrode), and obtains electromotive forces by their reactions. Fuel cells for mobile use includes a pair of electrodes at both sides of a proton conducting solid polymer electrolyte, and obtains an electromotive force by providing a fuel such as methanol and the like to the one electrode (fuel electrode) of the pair of electrodes and providing an oxidizing agent such as oxygen or air to the other electrode (air electrode). Electrolysis of water electrically decomposes water by a solid polymer electrolyte membrane into hydrogen and oxygen.

Fluorine-related electrolyte membrane such as perfluorocarbon sulfonic membrane having high proton conducting show very high long-term chemical stability as a solid polymer electrolyte membrane for fuel cells and water electrolysis. Typical products of the fluorine-related electrolyte membrane are NAFION (perfluorosulfonic acid polymer, trademark of Dupont), ACIPLEX (perfluorosulfonic acid polymer, trademark of Asahi Chemicals Co., Ltd.) and FLEMION (perfluorosulfonic acid polymer, trademark of Asahi Glass Co., Ltd.)

Electrolysis of a salt solution electrically decomposes a water solution of sodium chloride by a solid polymer electrolyte membrane into sodium hydroxide, chlorine, and hydrogen. As the solid polymer electrolyte membrane, in this case, the electrolyte membrane is in contact with a chlorine gas and a hot and concentrated water solution of sodium chloride and must be resistant to them. Therefore hydrocarbon-related electrolyte membranes are not available. In general, perfluorocarbon sulfonic membranes having carboxylic groups partially on its surface to prevent inverse diffusion of ions are used as solid polymer electrolyte membranes which is resistant to chlorine gas and hot and concentrated alkaline water.

Basically, the fluorine-related electrolyte represented by carbon sulfonic membranes has very high chemical stability due to C—F bonds. The fluorine-related electrolyte membranes are used not only as solid polymer electrolyte membranes for fuel cells, water electrolysis, or salt electrolysis but also as solid polymer electrolyte membranes for electrolysis of halogenated hydracid. Due to their high proton conductivity, the fluorine-related electrolyte membranes are also used for humidity sensors, gas sensors, oxygen concentrators, and so on.

Contrarily, the fluorine-related electrolyte membranes are hard to manufactured and very expensive. So their use is very limited, for example, to solid polymer electrolyte fuel cells for space and military fields and to other particular uses. They are hard to use for solid polymer electrolyte fuel cells as low-pollution power sources for automobiles and other public uses.

So various aromatic hydrocarbon electrolyte membranes as inexpensive solid polymer electrolyte membranes have been disclosed such as sulfonated poly-ether ether ketone by Japanese Non-examined Patent Publications No.H06-93114 (1994), sulfonated poly-ether sulfone by Japanese Non-examined Patent Publications No.H09-245818 (1997) and Japanese Non-examined Patent Publications No.H11-116679 (1999), sulfonated acrylonitrile butadiene styrene monomer by Japanese Non-examined Patent Publications No.H10-503788 (1998), sulfonated poly sulfide by Japanese Non-examined Patent Publications No.H11-510198 (1999), and sulfonated polyphenylene by Japanese Non-examined Patent Publications No.H11-515040 (1999). The aromatic hydrocarbon electrolyte membranes prepared by sulfonating engineer plastics are easier to manufacture and have a lower cost than fluorine-related electrolyte membranes represented by NAFION (perfluorosulfonic acid polymer, trademark of Dupont). However, one of the demerits of the aromatic hydrocarbon electrolyte membranes is to be easily deteriorated. This reason is revealed by Japanese Non-examined Patent Publications No.2000-106203. It says the main reason is that the structure of aromatic hydrocarbon is oxidized and broken by hydrogen peroxide which generates in the catalyst layer on the boundary between the solid polymer electrolyte membrane, and the air electrode (oxidant electrode).

So various trials have been made to prepare a solid polymer electrolyte which is as resistant to oxidation as the fluorine-related electrolyte membrane sulfonic type polystyrene graft ethylenetetrafluoroethylene (ETFE) co-polymer having a hydrocarbon-related side chain and a main chain formed US Patent Publications U.S. Pat. No. 4,012,303 and U.S. Pat. No. 4,605,685 propose a sulfonic poly-(trifluorostyrene) graft ETFE polymer electrolyte membrane which is prepared by copolymerizing fluorinecarbide-related vinyl monomer and hydrocarbon related vinyl monomer, grafting α, β, β-trifluorostyrene with the resulting membrane, and attaching sulfonic groups thereto. This membrane uses α, β, β-trifluorostyrene which is partially fluorinated instead of styrene because the polystyrene side chain having sulfonic groups is not chemically stable. However, it is very difficult to synthesize α, β, β-trifluorostyrene which is material of the side chains. Further, the material as well as Nafion is too expensive to be used as solid polymer electrolyte membranes for fuel cells. Furthermore, α, β, β-trifluorostyrene has low reactivity of polymerization and consequently the quantity of α, β, β-trifluorostyrene to be grafted for side chains is very small. The conductivity of the resulting membrane is very low. It is an object of the present invention to provide an easily manufactured, high durability solid polymer electrolyte which is durable as the fluorine-related electrolyte or has a substantially high chemical stability, a solid polymer electrolyte membrane making use thereof, a solution for covering the electrolyte catalyst, a membrane/electrode assembly, and a fuel cell.

SUMMARY OF THE INVENTION

To dissolve the aforesaid problems, we inventors researched the mechanism of deterioration of electrolyte membranes and found that the main cause of the deterioration of the aromatic hydrocarbon electrolyte membranes is not the deterioration by oxidation but rather the direct bonding of a sulfonic group to an aromatic ring. This direct bonding allows the sulfonic group to be easily cut out from the aromatic ring in the presence of a strong acid at a high temperature and as the result, causes reduction of its ionic conductivity. Judging from this result, the high-durability solid polymer electrolyte in accordance with the present invention is an aromatic hydrocarbon polymer having a sulfoalkyl group (FORMULA 1) instead of a sulfonic group in the side chain. The present invention can provide low-cost high durability solid polymer electrolyte which is as durable as the fluorine-related electrolyte or has substantially high chemical stability. Further, the ionic conductivity of the electrolyte having the sulfoalkyl groups in the side chains is greater than the ionic conductivity of the electrolyte having the sulfonic groups in the side chains (per weight equivalent to ion exchange group). It is assumed that it is related to that the sulfoalkyl groups can move more freely than the sulfonic groups.

Said aromatic hydrocarbon polymer compound is preferably poly-ether sulfone polymer compounds, poly ether ether ketone polymer compounds, polyphenylene sulfide polymer compounds, polyphenylene ether polymer compounds, poly-sulfone polymer compounds, or poly ether ketone polymer compounds.

It is preferable that the polymer electrolyte membrane and the solution for covering electrode catalysts contain said polymer electrolyte.

In accordance with the present invention, it is preferable that a membrane/electrode assembly for a solid polymer electrolyte fuel cell comprises a polymer electrolyte membrane and a gas diffusion electrode unit comprising a cathode and an anode which are placed on both sides of said polymer electrolyte membrane, wherein said polymer electrolyte membrane is any polymer electrolyte membrane stated above, said gas diffusion electrodes bind fine catalytic metal particles to the surfaces of a conductive material made of carbon with a binder, and said binder is made of any polymer electrolyte stated above.

In accordance with the present invention, it is preferable that a solid polymer electrolyte fuel cell comprise a polymer electrolyte membrane, one pair of gas diffusion electrodes comprising a cathode and an anode which are placed on both sides of said polymer electrolyte membrane, one pair of gas impermeable separators which are provided to sandwich said gas diffusion electrodes, and one pair of current collecting members which are placed between said solid polymer and said separator, wherein said solid polymer electrolyte membrane is made of any polymer electrolyte membrane stated above and said polymer electrolyte membrane and said gas diffusion electrodes are made of said membrane/electrode assembly for a solid polymer electrolyte fuel cell.

DESCRIPTION OF THE PREFERRED EMBODIMENT

Figure 1:
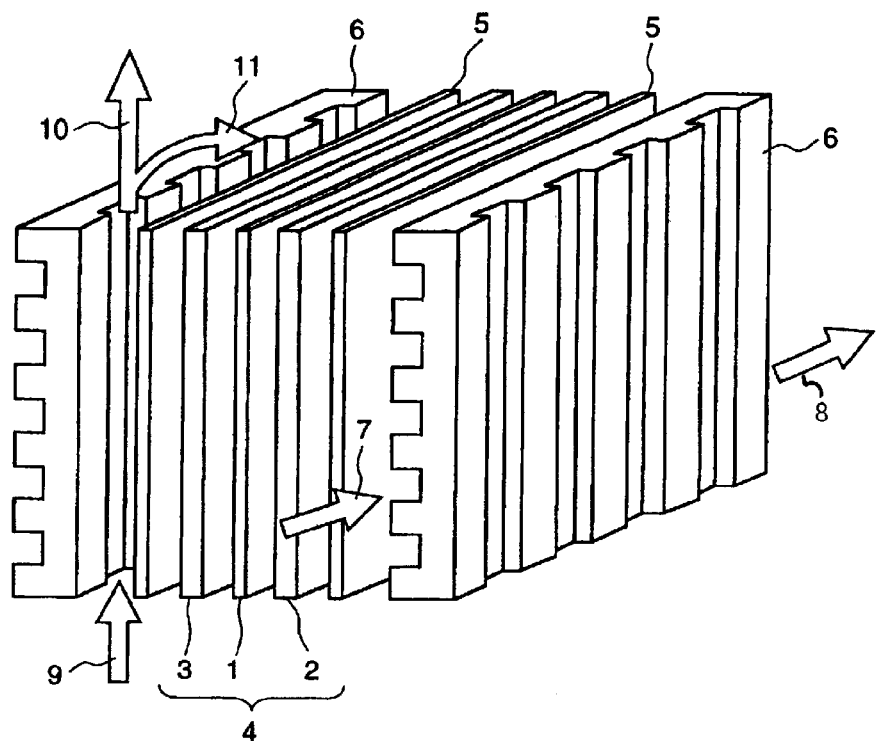
FIG. 1 shows the structure of a unit cell of a solid polymer electrolyte fuel cell.

The sulfoalkyl aromatic hydrocarbon electrolyte in accordance with the present invention can be any as far as its side chain contains sulfoalkyl groups and its main chain contains aromatic rings. Substantially, the aromatic hydrocarbon electrolyte is an aromatic hydrocarbon polymer compound prepared by attaching a sulfoalkyl group (represented by FORMULA 1) to engineering plastics or its polymer alloy such as poly-ether ether ketone (PEEK) having a structural unit (represented by FORMULA 2) developed by ICI Co., Ltd. (Great Britain) in 1977, semi-crystalline poly-allyl ether ketone (PAEK) developed by BASF (Germany), poly-ether ketone (PEK) having a structural unit (represented by FORMULA 3) distributed by Sumitomo Chemicals Co., Ltd. and other companies, poly-ketone (PK) distributed by Teijin Amoco Engineering Plastics Ltd., poly-ether sulfone (PES) having a structural unit (represented by FORMULA 4)

distributed by Mitsui Chemicals Co., Ltd. and other companies, poly-sulfone having a structural unit (represented by FORMULA 5) distributed by Teijin Amoco Engineering Plastics Ltd., linear or bridged polyphenylene sulfide (PPS) having a structural unit (represented by FORMULA 6) distributed by Toray, Dainippon Ink and Chemicals Inc., Tohpren Co., Ltd., Idemitsu Petrochemical Co., Ltd., Kureha Chemical Industry Co., Ltd. and other companies, and reformed polyphenylene ether (PPE) having a structural unit (represented by FORMULA 7) distributed by Asahi Chemical Industry Co., Ltd., Japan GE Plastics, Mitsubishi Engineering Plastics Co., Ltd. and Sumitomo Chemicals Co., Ltd. Among the above polymer compounds, sulfoalkyl PEEK, PAEK, PEK, PK, PPS, and PES are preferable judging from resistance to oxidation of the main chains.

FORMULA 1

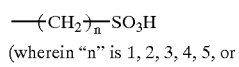

(wherein "n" is 1, 2, 3, 4, 5, or 6)

FORMULA 2

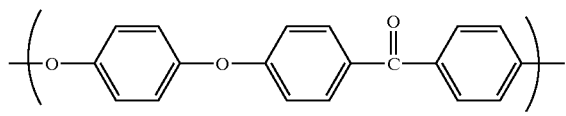

FORMULA 3

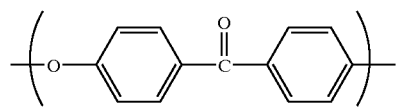

FORMULA 4

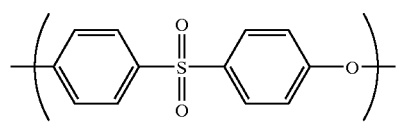

FORMULA 5

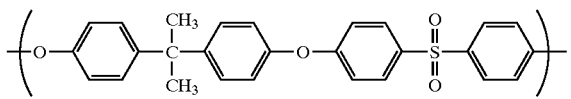

FORMULA 6

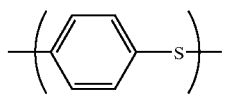

FORMULA 7

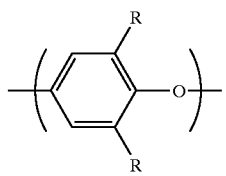

(wherein "R" is a lower alkyl group such as methyl group or ethyl group or a ph nyl group)

Any sulfoalkylation method can be employed to attach sulfoalkyl groups to aromatic hydrocarbon polymer or its polymer alloy (FORMULA 1). For example, one method uses solution (FORMULA 8) which is described in J. Amer. Chem. Soc., 76, 5357–5360 (1954) to attach a sulfoalkyl group to an aromatic ring.

FORMULA 8

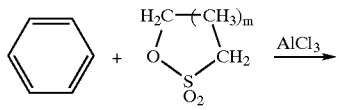

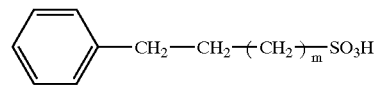

(wherein "m" is 1or 2.)

Another method takes the steps of substituting a hydrogen atom of an aromatic ring by lithium, substituting lithium by a halogenoalkyl group by dihalogenoalkane, and converting the halogenoalkyl group into a sulfoalkyl group. A further method comprises the steps of attaching a halogenobutyl group to an aromatic ring by a tetramethylenehalogenium ion and substituting the halogen atom by a sulfonic group. See FORMULA 9.

FORMULA 9

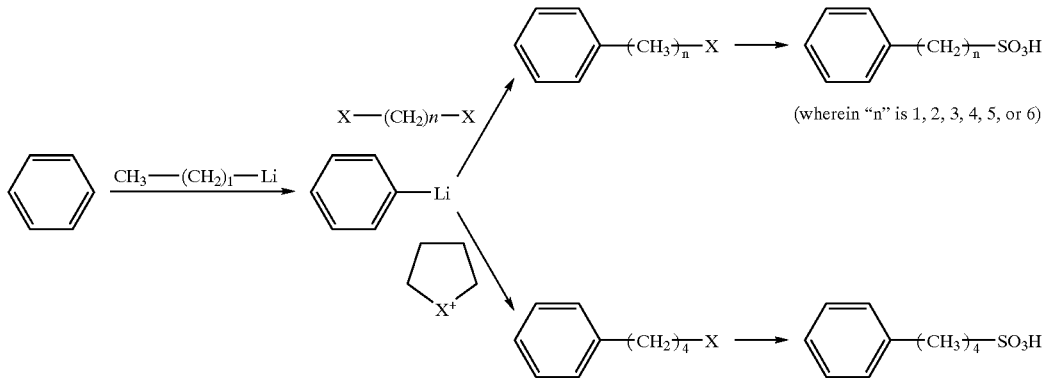

(wherein "x" is halogen.)

The present invention does not limit a method of sulfoalkylating an aromatic hydrocarbon polymer compound, but a method represented by FORMULA 8 is preferable judging from cost reduction.

The equivalent weight of ion exchange group of the polymer electrolyte (that is, sulfoalkylated polymer) in accordance with the present invention is 250 g/mol to 2500 g/mol, preferably 300 g/mol to 1500 g/mol, more preferably 350 g/mol to 1000 g/mol. If the equivalent weight of ion exchange group exceeds 2500 g/mol, the output performance will reduce and if it falls below 250 g/mol, the water-resistance of said polymer will reduce. These are not preferable.

The equivalent weight of ion exchange group in the present invention represents a molecular weight of said sulfoalkylated polymer per sulfoalkyl group. Smaller equivalent weight indicates higher degree of sulfoalkylation. The equivalent weight of ion exchange group can be measured by 1H-NMR spectroscopy, elementary analysis, acid-base titration or non-aqueous acid-base titration stated in Japan Patent Publication H01-52866 (1989) (using a benzene methanol solution of potassium methoxide as the normal solution).

The equivalent weight of ion exchange group of the sulfoalkylated polymer can be controlled to be in the range of 250 g/mol to 2500 g/mol by selecting a compounding ratio of aromatic hydrocarbon polymer and sulfoalkylating agent, a reaction temperature, a reaction time, a chemical structure of the aromatic hydrocarbon polymer.

The polymer electrolyte in accordance with the present invention is usually used in a form of membrane in a fuel cell. Any method can be used to form a sulfoalkylated polymer membrane. Typical forming methods are a solution casting method which forms a membrane from a polymer solution and a molten pressing or extruding method which forms a membrane from a molten polymer. In details, the solution casting method comprises the steps of spreading a polymer solution over a glass plate and removing its solvent. The solvent can be any as far as it dissolves the polymer and is easily removed from the polymer. Preferable solvents are non-proton polar solvent such as N,N'-dimethylformamide, N,N-dimethylacetoamide, N-methyl-2-pyrolidone, and dimethylsulfoxide, Alkylene glycol such as ethylene glycol mono-methylether, ethylene glycol mono-ethylether, propylene glycol mono-methylether, and propylene glycol mono-ethylether, and halogen solvent.

The thickness of said polymer electrolyte membrane can be any but preferably 10 $\mu$m to 200 $\mu$m and more preferably 30 $\mu$m to 100 $\mu$m. The membrane is preferably thicker than 10 $\mu$m to be strong enough for actual uses and thinner than 200 $\mu$m to reduce the resistance of the membrane, that is, to increase the power generation performance. The solution casting method can control the thickness of the membrane by selecting a concentration of the polymer solution or thickness of the polymer solution spread over a substrate. The thickness of a membrane sheet made by the molten pressing or extruding method can be controlled by rolling at a preset rate.

When the electrolyte in accordance with the present invention is manufactured, additives such as plasticizer, stabilizer, and parting agent can be added to the electrolyte without departing from the spirit and scope of the invention. The gas diffusion electrodes used for a membrane/electrode assembly in a fuel cell are made of conductive materials carrying catalyst metal particles on them. The gas diffusion electrodes can contain water repellent and/or binding agent if necessary. It is possible to position, outside the catalyst layer, a layer comprising a conductive material without a catalyst and a water repellent and/or binding agent if necessary. Catalytic metals available to the gas diffusion electrodes can be any as far as they accelerate oxidation reaction of hydrogen and reduction reaction of hydrogen. Such metals are platinum, gold, silver, palladium, iridium, rhodium, ruthenium, iron, cobalt, nickel, chromium, tungsten, manganese, vanadium, or their alloys. Among these catalysts, platinum is used in most cases. Usually, the sizes of catalytic metals are 10 angstroms to 300 angstroms. These catalysts are preferably deposited on carriers such as carbon, reducing the quantity of catalysts to be used and material costs. The preferable amount of catalyst to be carried by the carrier is 0.01 mg/cm$^2$ to 10 mg/cm$^2$.

The conductive material can be any as far as it is electron conductive such as metals and carbon materials. The preferable carbon materials are carbon black (such as furnace black, channel black, and acetylene black), active carbon, graphite, and so on. These carbon materials are used singly or in combination. For example, fluorocarbon is used as a water repellent. As for a binder, it is preferable to use the solution for covering the electrode catalysts in accordance with the present invention judging from a point of view of bonding property, but other resins can be used as the binder. In such a case, a preferable binder is a fluoro resin having a water-repellent property and more particularly has excellent heat-resistance and oxidation-resistance. Such resins are poly-tetrafluoroethylene, tetrafluoroethylene-perfluoroalkyl-vinylether copolymer, and tetrafluoroethylene-hexafluoro-propylene copolymer.

Further, an electrolyte membrane and an electrode assembling method for a fuel cell are not limited here and any prior method can be used. One method of manufacturing a membrane/electrode assembly comprises for example the steps of adding platinum catalyst powder carried by carbon into a polytetrafluoroethylene suspension, spreading the mixture over a piece of carbon paper, heat-treating the paper to form a catalyst layer, spreading an electrolyte solution which is the same as the electrolyte membrane over the catalyst layer, and hot-pressing the electrolyte membrane and the catalyst layer in a body. The other methods are a method of coating platinum catalyst powder in advance with an electrolyte solution which is the same as the electrolyte membrane, a method of applying a catalyst paste onto the electrolyte membrane, a method of electroless-plating an electrode on the electrolyte membrane, and a method of causing the electrolyte membrane to absorb complex ions of a platinum group and reducing thereof.

A solid polymer electrolyte fuel cell piles up a plurality of unit cells each of which consists of a membrane/electrode assembly (comprising an electrolyte membrane and gas diffusion electrodes) and outer plates (a grooved fuel distributing plate having fuel paths and a grooved oxidant distributing plate having oxidant paths) which also work as current collectors with a cooling plate between the cells. It is preferable to operate a fuel cell at a higher temperature. This is because the activity of the electrode catalyst increases and as the result overvoltages on the electrodes reduce at a high temperature. However, as the electrolyte membrane cannot work without water, the operating temperature of the fuel cell must be such that the water may be controlled. Therefore, the preferable operating temperature of the fuel cell is between a room temperature and 100° C.

The present invention will be explained in more detail from the following description of embodiments. It is to be expressly understood, however, that the embodiments are for purpose of explanation only and are not intended as a definition of the limits of the invention. The conditions of measuring respective properties are as follows:

(1) Ion Exchange Group Equivalent Weight.

We took an exact weight ("a" gram) of sample sulfoalkylated polymer in a glass container which could be tightly sealed, added an excessive calcium chloride aqueous solution to the content of the glass container, stirred the content for one night, and titrated hydrogen chloride which generated in the glass container with a 0.1N standard aqueous solution of sodium hydroxide (potency: f) by using a phenolphthalein indicator ("b" ml). The Ion exchange group equivalent weight (g/mol) was calculated by Ion exchange group equivalent weight=(1000×a)/(0.1×b×f).

(2) Evaluation of Output Performance of a Unit Cell of the Fuel Cell.

We set an electrolyte bonded with electrodes in a sample unit cell and measured the output performance of the unit cell.

We supplied hydrogen gas and oxygen gas at one atmospheric pressure to the sample unit cell through a water bubbler (at 23° C.) to humidify the gases. The flow rates of the hydrogen gas and the oxygen gas are respectively 60 ml/min (for hydrogen) and 40 ml/min (for oxygen). The temperature of the cell is 70° C. We measured the output performance of the cell by the H201B charging/discharging unit (Hokuto Denko Co., Ltd.).

[Embodiment 1]

(1) Preparation of Sulfopropyl Polyether Sulfone

We prepared sulfopropyl polyether sulfone by setting up a 500-ml 4-neck round bottom flask with a reflux condenser, a stirrer, a thermometer, and a desiccant tube (containing calcium chloride in it), substituting the air inside the flask by nitrogen gas, putting 21.6 g of polyethersulfone (PES), 12.2 g (0.1 mol) of propansultone and 50 ml of dry nitrobenzene in the flask, adding 14.7 g (0.11 mol) of aluminum chloride anhydride to the mixture gradually for 30 minutes while stirring thereof, refluxing the mixture for 8 hours after addition of aluminum chloride anhydride is completed, adding 500 ml of iced water containing 25 ml of concentrated hydrochloric acid to the reactant to stop the reaction, dripping the reactant solution slowly into 1 liter of deionized water, filtering the deionized water to recover the precipitate (sulfopropyl polyethersulfone), repeating mixing the precipitate with deionized water and suction-filtering the mixture until the filtrate becomes neutral, and vacuum-drying the precipitate at 120° C. for one night. The ion exchange group equivalent weight of the obtained sulfopropyl polyethersulfone is 980 g/mol.

The cost of the sulfopropyl polyethersulfone electrolyte is one fiftieth of the cost of perfluorosulfonic electrolyte which is prepared from expensive material in five processes because the sulfopropyl polyethersulfone electrolyte is prepared in a single process from poly-ether sulfone which is very cheap engineering plastics on-market.

We put 1.0 g of obtained sulfopropyl polyethersulfone and 20 ml of deionized water in a TEFLON (polytetrafluoroethylene, trademark of Dupont)-coated hermetic stainless steel container, kept the container at 120° C. for 2 weeks, cooled the container and then measured the ion exchange group equivalent weight of sulfopropyl polyethersulfone. As the result, we found that the ion exchange group equivalent weight of sulfopropyl polyethersulfone remains unchanged (980 g/mol) and that sulfopropyl polyethersulfone is as stable as the expensive perfluorosulfonic electrolyte. Contrarily as shown by the comparative example 1 below, the cheap sulfonated aromatic hydrocarbon electrolyte is deteriorated under the same temperature and hydrolysis condition. Its ion exchange group equivalent increases up to 3,000 g/mol (which was initially 960 g/mol) and sulfone groups were dissociated. In other words, the low-cost sulfopropyl polyethersulfone electrolyte unlike the cheap sulfonated aromatic hydrocarbon electrolyte (see Comparative example 1) shows very good chemical stability as well as the expensive perfluorosulfonic electrolyte, satisfying both low cost and high performance.

(2) Preparation of an Electrolyte Membrane

We prepared an electrolyte membrane by dissolving the product obtained by the above description (1) into a mixture of 20 parts of N,N'-dimethylformamide, 80 parts of cyclohexanon, and 25 parts of methylethylketone so that the solution may contain 5% by weight of the product, spreading this solution over a glass plate by spin-coating, air-drying thereof, and vacuum-drying thereof at 80° C. The obtained electrolyte membrane I is 42 μm thick and its ion exchange group equivalent is 5 S/cm.

We put said obtained electrolyte membrane I and 20 ml of deionized water in a Teflon-coated hermetic stainless steel container, kept the container at 120° C. for 2 weeks, cooled the container and then measured its ion exchange group equivalent weight. As the result, we found that the ion exchange group equivalent weight of the obtained electrolyte membrane remains unchanged as well as the expensive perfluorosulfonic electrolyte. The membrane itself is tough enough. Contrarily as shown by the comparative example 1-(2), the comparatively cheap sulfonated aromatic hydrocarbon electrolyte II is broken and ragged under the same temperature and hydrolysis condition. In other words, the low-cost sulfopropyl polyethersulfone electrolyte unlike the cheap sulfonated aromatic hydrocarbon electrolyte (see Comparative example 1-(2)) shows very good chemical stability as well as the expensive perfluorosulfonic electrolyte, satisfying both low cost and high performance.

(3) Preparation of a Solution for Covering Electrode Catalyst and a Membrane/Electrode Assembly We prepared a solution I for covering electrode catalyst by adding a solvent mixture of N,N'-dimethylformamide, cyclohexanon, and methylethylketone which contains 5% by weight of the product (see (2)) to carbon carrying 40% by weight of platinum so that the ratio by weight of platinum catalyst and the polymer electrolyte might be 2:1, and dispersing the mixture uniformly. Next we prepared a membrane/electrode assembly I by coating both sides of the electrolyte membrane I (obtained by (2)) with said solution I for covering electrode catalyst, and drying thereof. The obtained membrane/electrode assembly I carries 0.25 mg/cm$^2$ of platinum.

Similarly we prepared a membrane/electrode assembly I' carrying 0.25 mg/cm$^2$ of platinum by coating both sides of the electrolyte membrane I (obtained by (2)) with said solution II for covering electrode catalyst stated by Comparative example 1 (2), and drying thereof.

We prepared a paste (a solution for covering electrode catalyst) by adding an alcohol-water mixture of 5% by weight as perfluorocarbon sulfonic electrolyte to carbon carrying 40% by weight of platinum so that the ratio by weight of platinum catalyst and the polymer electrolyte might be 2:1, and dispersing the mixture uniformly. Next we coated both sides of the electrolyte membrane I (obtained by (2)) with this paste (solution). However, the paste could not be uniformly spread over the electrolyte membrane and we could not get a membrane/electrode assembly. Therefore, the solution I is superior as a solution for covering electrode catalysts.

We put said obtained membrane/electrode assembly I and 20 ml of deionized water in a TEFLON (polytetrafluoroethylene, trademark of Dupont)-coated hermetic stainless steel container, kept the container at 120° C. for 2 weeks, cooled the container and then measured its ion exchange group equivalent weight. As the result, we found that the ion exchange group equivalent weight of the obtained electrolyte membrane remains unchanged as well as the membrane/electrode assembly prepared from the expensive perfluorosulfonic membrane and the perfluorosulfonic electrolyte. The membrane itself is tough enough Similarly, we put said obtained membrane/electrode assembly I' and 20 ml of deionized water in a TEFLON (polytetrafluoroethylene, trademark of Dupont)-coated hermetic stainless steel container, kept the container at 120° C. for 2 weeks, cooled the container and then measured its property.

As the result, we found that the membrane/electrode assembly I' has enough power generating performance although the electrode was partially separated.

Contrarily as shown by the comparative example 1 (3), the membrane/electrode assembly II prepared by comparatively cheap sulfonated aromatic hydrocarbon electrolyte II and the electrode catalyst covering solution II is broken and ragged under the same temperature and hydrolysis condition. In other words, the low-cost sulfopropyl polychlorofluoroethylene membrane/electrode assembly unlike the cheap sulfonated aromatic hydrocarbon electrolyte membrane (see Comparative example 1 (3)) is as stable as the expensive perfluorosulfonic membrane/electrolyte assembly, and satisfies both low cost and high performance.

(4) Endurance Test of Unit Cells of a Fuel Cell.

We evaluated the output performance of fuel cells by dipping said membrane/electrode assembly I and I' in deionized boiling water to let the assemblies absorb water and setting each wet membrane/electrode assembly in a sample unit. FIG. 1 shows the structure of the sample unit cell of the solid polymer electrolyte fuel cell which comprises said membrane/electrode assembly 4 which is prepared by (3) and made up with a polymer electrolyte membrane 1, an oxygen electrode 2 and an hydrogen electrode 3, current collecting members 5 which are supported and sealed by thin packing material made of carbon paper on the electrodes, and conductive separators 6 (bipolar plates) provided on outer sides of the current collecting members 5 to separate electrodes from the chamber and to supply gasses. The oxygen electrode 2 works as a cathode and the hydrogen electrode 3 works as an anode. Air was passed in a direction from the air inlet 7 to the air outlet 8; fuel (in this case, hydrogen) was passed in a direction from the fuel inlet 9 to fuel outlet 10; and water yielded by power generation and water accompanied with transportation of protons was separated in a direction to the water outlet 11.

Figure 2:
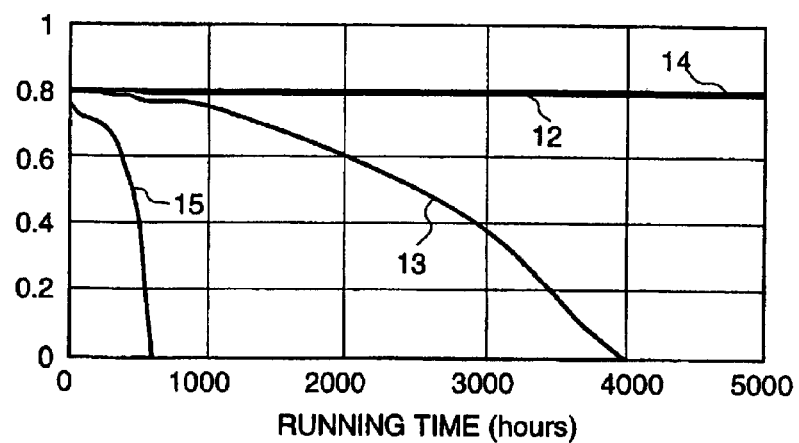
FIG. 2 shows the result of an endurance test of the unit cell of a solid polymer electrolyte fuel cell.

We measured the output voltage of said unit cell of the solid polymer electrolyte fuel cell while running the unit cell for a long time at a current density of 300 mA/cm$^2$. FIG. 2 shows the relationship between the output voltage and the running time of the unit cell. The curve 12 in FIG. 2 is the result of the endurance test of the unit cell using the membrane/electrode assembly I in accordance with the present invention. The curve 13 in FIG. 2 is the result of the endurance test of the unit cell using the membrane/electrode assembly I'. The curve 14 in FIG. 2 is the result of the endurance test of the unit cell using a perfluorosulfonic membrane/electrode assembly. As shown by curve 12 in FIG. 2, the output voltage of the membrane/electrode assembly I is initially 0.8 V and keeps at 0.8 V even after the unit cell runs 5,000 hours, which is the same as the behavior of the output voltage of the unit cell using a perfluorosulfonic membrane/electrode assembly (by curve 14). As shown by curve 15 in FIG. 2, the output voltage (of a unit cell using sulfonated aromatic hydrocarbon electrolyte of Comparative example 1 below) is initially 0.73 V but completely exhausted after the fuel cell runs 600 hours. Judging from these, it is apparent that the unit cell of a fuel cell using an aromatic hydrocarbon electrolyte having a sulfonic group bonded to the aromatic ring via an alkyl group is more durable than the unit cell of a fuel cell using an aromatic hydrocarbon electrolyte having a sulfonic group directly bonded to the aromatic ring. Further, although both membrane/electrode assemblies of Embodiment 1 and Comparative example 1 carry 0.25 mg/cm$^2$ of platinum, the output voltage of Embodiment 1 is greater than the output voltage of Comparative example 1. This is because the ion conductivities of the electrolyte and the electrode catalyst covering solution in the membrane/electrode assembly of Embodiment 1 are greater than those of the electrolyte and the electrode catalyst covering solution in the membrane/electrode assembly of Comparative example 1 and because the membrane/electrode assembly of Embodiment 1 is superior to the membrane/electrode assembly of Comparative example 1.

(5) Preparation of Fuel Cells

We piled up 36 unit cells which were prepared in (4) to form a solid polymer electrolyte fuel cell. This fuel cell outputs 3 KW.

COMPARATIVE EXAMPLE 1

(1) Preparation of Sulfonated Polyether Sulfone

We prepared sulfonated polyether sulfone by setting up a 500-ml 4-neck round bottom flask with a reflux condenser, a stirrer, a thermometer, and a desiccant tube (containing calcium chloride in it), substituting the air inside the flask by nitrogen gas, putting 25 g of polyethersulfone (PES) and 125 ml of concentrated sulfuric acid in the flask, stirring the mixture at a room temperature for one night in the presence of nitrogen gas to make a uniform solution, dripping 48 ml of chlorosulfuric acid first slowly (because the chlorosulfuric acid vigorously reacts with water in the sulfuric acid with bubbles) by a dropping funnel into the uniform solution in the presence of nitrogen gas, completing dripping within 5 minutes after bubbling calms down, stirring the reactant solution at 25° C. for three and half hours to sulfonate thereof, dripping the reactant solution slowly into 15 liters of deionized water, filtering the deionized water to recover the precipitate (sulfonated poly-ethersulfone), repeating mixing the precipitate with deionized water and suction-filtering the mixture until the filtrate becomes neutral, and vacuum-drying the precipitate at 80° C. for one night. The ion exchange group equivalent weight of the obtained sulfonated poly-ethersulfone electrolyte is 960 g/mol.

We put 1.0 g of obtained sulfonated polyethersulfone electrolyte and 20 ml of deionized water in a TEFLON (polytetrafluoroethylene, trademark of Dupont)-coated hermetic stainless steel container, kept the container at 120° C. for 2 weeks, cooled the container and then measured the ion exchange group equivalent weight of sulfonated polyethersulfone. As the result, we found that the ion exchange group equivalent weight of sulfonated polyethersulfone electrolyte is 3,000 g/mol which is greater than the initial ion exchange group equivalent weight (960 g/mol). This means that the sulfonic groups are dissociated.

(2) Preparation of an Electrolyte Membrane

We prepared an electrolyte membrane by dissolving sulfonated polyethersulfone electrolyte obtained by the above description (1) into a mixture of 20 parts of N,N'-dimethylformamide, 80 parts of cyclohexanon, and 25 parts of methylethylketone so that the solution may contain 5% by weight of the product, spreading this solution over a glass plate by spin-coating, air-drying thereof, and vacuum-drying thereof at 80° C. The obtained electrolyte membrane II is 45 μm thick and its ion exchange group equivalent is 0.02 S/cm.

We put said obtained electrolyte membrane II and 20 ml of deionized water in a TEFLON (polytetrafluoroethylene, trademark of Dupont)-coated hermetic stainless steel container, kept the container at 120° C. for 2 weeks, cooled the container and then inspected thereof, membrane broken and ragged. As the result, we found the electrolyte membrane broken and ragged.

(3) Preparation of a Solution for Covering Electrode Catalyst and a Membrane/Electrode Assembly We prepared a solution II for covering electrode catalyst by adding a solvent mixture of N,N'-dimethylformamide, cyclohexanon, and methylethylketone which contains 5% by weight of the product (see (2)) to carbon carrying 40% by weight of platinum so that the ratio by weight of platinum catalyst and the polymer electrolyte might be 2:1, and dispersing the mixture uniformly. Next we prepared a membrane/electrode assembly II by coating both sides of the electrolyte membrane II (obtained by (2)) with said solution II for covering electrode catalyst, and drying thereof. The obtained membrane/electrode assembly II carries 0.25 mg/cm$^2$ of platinum.

We put said obtained membrane/electrode assembly II and 20 ml of deionized water in a Teflon-coated hermetic stainless steel container, kept the container at 120° C. for 2 weeks, cooled the container and then inspected thereof. As the result, we found the membrane/electrode assembly II broken and ragged.

(4) Endurance Test of Unit Cells of a Fuel Cell

We assembled the membrane/electrode assembly II of Comparative example 1, thin carbon-paper packing materials (as supporting current collectors) at both sides of the assembly, and conductive separators (bipolar plates) provided at outer sides thereof and also working to separate the electrodes from the chamber and to flow gases to the electrodes into a unit cell for a solid polymer electrolyte fuel cell, and ran the unit cell for a long time at a current density of 300 mA/cm$^2$. As the result, the output voltage of the unit cell was initially 0.73V but exhausted after a 600-hours run, as shown by the curve 15 in FIG. 2.

The cost of the sulfopropyl polyethersulfone electrolyte is one fiftieth of the cost of perfluorosulfonic electrolyte which is prepared from expensive material in five processes because the sulfopropyl polyether sulfone electrolyte is prepared in a single process from polyether sulfone which is very cheap engineering plastics on-market.

As seen from Embodiment 1 and Comparative example 1-(1), the cheap sulfopropyl polyethersulfone electrolyte unlike the cheap sulfonated aromatic hydrocarbon electrolyte (see Comparative example 1 (1)) shows very good chemical stability as well as the expensive perfluorosulfonic electrolyte, satisfying both low cost and high performance.

Referring to Embodiment 1 and Comparative examples 1-(1) and 1-(2), although the ion exchange group equivalent weight (980 g/mol) of Embodiment 1 (aromatic hydrocarbon electrolyte having a sulfonic group bonded to the aromatic ring via an alkyl group) is a little greater than that (960 g/mol) of Comparative example 1 (aromatic hydrocarbon electrolyte having a sulfonic group directly bonded to the aromatic ring), the ion conductivity of the electrolyte membrane of Embodiment 1 is greater than the ion conductivity of the electrolyte membrane of Comparative example 1. (Usually the ion conductivity of an electrolyte membrane is greater as the ion exchange group equivalent weight of the electrolyte membrane is smaller.) Therefore the electrolyte membrane of Embodiment 1 is superior to that of Comparative example 1. Referring to Embodiment 1 and Comparative examples 1-(2), the cheap sulfopropyl polyethersulfone electrolyte membrane unlike the sulfonated aromatic hydrocarbon electrolyte membrane shows very good chemical stability as well as the expensive perfluorosulfonic electrolyte membrane, satisfying both low cost and high performance.

Referring to Embodiment 1 and Comparative examples 1-(3), the cheap sulfopropyl polyethersulfone membrane/electrode assembly unlike the sulfonated aromatic hydrocarbon membrane/electrode assembly shows very good chemical stability as well as the expensive perfluorosulfonic membrane/electrode assembly, satisfying both low cost and high performance.

Referring to Embodiment 1 and Comparative examples 1-(4), the output voltage of the unit cell of a fuel cell using the electrode catalyst covering solution of Embodiment 1 is greater than the output voltage of the unit cell of a fuel cell using the electrode catalyst covering solution of Comparative example 1 and the electrode catalyst covering solution of Embodiment 1 is superior to the electrode catalyst covering solution of Comparative example 1. The unit cell of a fuel cell of the present invention is low cost and as durable as the unit cell of a perfluorosulfonic fuel cell and has substantially high chemical stability unlike the unit cell of the sulfonated aromatic hydrocarbon fuel cell.

Referring to the curve 12 (for a unit cell of Embodiment 1) of FIG. 2, the output voltage of the membrane/electrode assembly I is initially 0.8 V and keeps at 0.8 V even after the unit cell runs 5,000 hours, which is the same as the behavior of the output voltage of the unit cell using a perfluorosulfonic membrane/electrode assembly (by curve 14). Contrarily, the output of curve 15 (for a unit cell of Comparative example 1) is initially 0.73 V but completely exhausted after the fuel cell runs 600 hours. Judging from these, it is apparent that the unit cell of a fuel cell using an aromatic hydrocarbon electrolyte having a sulfonic group bonded to the aromatic ring via an alkyl group is more durable than the unit cell of a fuel cell using an aromatic hydrocarbon electrolyte having a sulfonic group directly bonded to the aromatic ring. Further, although both membrane/electrode assemblies of Comparative examples 1 and 2 carry 0.25 mg/cm$^2$ of platinum, the output voltage of Embodiment 1 is greater than the output voltage of Comparative example 1. This is because the ion conductivities of the electrolyte and the electrode catalyst covering solution in the membrane/electrode assembly of Embodiment 1 are greater than those of the electrolyte and the electrode catalyst covering solution in the membrane/electrode assembly of Comparative example 1 and because the membrane/electrode assembly of Embodiment 1 is superior to the membrane/electrode assembly of Comparative example 1

[Embodiment 2]

(1) Preparation of Sulfonated Polyether Etherketone

We prepared sulfopropyl polyether etherketone by setting up a 500-ml 4-neck round bottom flask with a reflux condenser, a stirrer, a thermometer, and a desiccant tube (containing calcium chloride in it), substituting the air inside the flask by nitrogen gas, putting 14.5 g of polyether etherketone, 12.2 g (0.1 mol) of propansultone and 50 ml of dry nitrobenzene in the flask, adding 14.7 g (0.11 mol) of aluminum chloride anhydride to the mixture gradually for 30 minutes while stirring thereof, refluxing the mixture for 30 hours after addition of aluminum chloride anhydride is completed, dripping the reactant solution slowly into 0.5 liter of deionized water, filtering the deionized water to recover the precipitate (sulfopropyl polyether etherketone), repeating mixing the precipitate with deionized water and suction-filtering the mixture until the filtrate becomes neutral, and vacuum-drying the precipitate at 120° C. for one night. The ion exchange group equivalent weight of the obtained sulfopropyl polyether etherketone is 800 g/mol.

The cost of the sulfopropyl polyether etherketone electrolyte is one fortieth of the cost of perfluorosulfonic electrolyte which is prepared from expensive material in five processes because the sulfopropyl polyether etherketone electrolyte is prepared in a single process from poly-ether etherketone which is very cheap engineering plastics on-market.

We put 1.0 g of obtained sulfopropyl polyether etherketone and 20 ml of deionized water in a TEFLON (polytetrafluoroethylene, trademark of Dupont)-coated hermetic stainless steel container, kept the container at 120° C. for 2 weeks, cooled the container and then measured the ion exchange group equivalent weight of sulfopropyl polyether etherketone. As the result, we found that the ion exchange group equivalent weight of sulfopropyl polyether etherketone remains unchanged (800 g/mol) and that sulfopropyl polyether etherketone is as stable as the expensive perfluorosulfonic electrolyte. Contrarily as shown by the comparative example 2-(1) below, the cheap sulfonated aromatic hydrocarbon electrolyte is deteriorated under the same temperature and hydrolysis condition. Its ion exchange group equivalent increases up to 2,500 g/mol (which was initially 600 g/mol) and sulfone groups were dissociated. In other words, the low-cost sulfopropyl polyether etherketone electrolyte unlike the cheap sulfonated aromatic hydrocarbon electrolyte (see Comparative example 2-(1)) shows very good chemical stability as well as the expensive perfluorosulfonic electrolyte, satisfying both low cost and high performance.

(2) Preparation of an Electrolyte Membrane

We prepared an electrolyte membrane III by dissolving the product obtained by the above description (1) into a solvent solution of N-methyl pyrolidone, spreading this solution over a glass plate by spin-coating, air-drying thereof, and vacuum-drying thereof at 80° C. The obtained electrolyte membrane III is 42 $\mu$m thick.

We put said obtained electrolyte membrane III and 20 ml of deionized water in a TEFLON (polytetrafluoroethylene, trademark of Dupont)-coated hermetic stainless steel container, kept the container at 120° C. for 2 weeks, cooled the container and then measured its ion exchange group equivalent weight. As the result, we found that the ion exchange group equivalent weight of the obtained electrolyte membrane remains unchanged as well as the expensive perfluorosulfonic electrolyte. The membrane itself is tough enough. Contrarily as shown by the comparative example 2-(2), the comparatively cheap sulfonated aromatic hydrocarbon electrolyte IV is broken and ragged under the same temperature and hydrolysis condition. In other words, the low-cost sulfopropyl polyethersulfone electrolyte unlike the cheap sulfonated aromatic hydrocarbon electrolyte IV (see Comparative example 2-(2)) shows very good chemical stability as well as the expensive perfluorosulfonic electrolyte, satisfying both low cost and high performance.

(3) Preparation of a Solution for Covering Electrode Catalyst and a Membrane/Electrode Assembly We prepared a solution III for covering electrode catalyst by adding a N-methylpyrolidone solution to carbon carrying 40% by weight of platinum so that the ratio by weight of platinum catalyst and the polymer electrolyte might be 2:1, and dispersing the mixture uniformly. Next we prepared a membrane/electrode assembly III by coating both sides of the electrolyte membrane III (obtained by (2)) with said solution III for covering electrode catalyst, and drying thereof. The obtained membrane/electrode assembly III carries 0.25 mg/cm$^2$ of platinum.

Similarly we prepared a membrane/electrode assembly III' carrying 0.25 mg/cm$^2$ of platinum by coating both sides of the electrolyte membrane III (obtained by (2)) with said solution IV for covering electrode catalyst stated by Comparative example 2-(3), and drying thereof.

We prepared a paste (a solution for covering electrode catalyst) by adding an alcohol-water mixture of 5% by weight as perfluoro sulfonic electrolyte to carbon carrying 40% by weight of platinum so that the ratio by weight of platinum catalyst and the polymer electrolyte might be 2:1, and dispersing the mixture uniformly. Next we coated both sides of the electrolyte membrane III (obtained by (2)) with this paste (solution). However, the paste could not be uniformly spread over the electrolyte membrane and we could not get a membrane/electrode assembly.

We put said obtained membrane/electrode assembly and 20 ml of deionized water in a TEFLON (polytetrafluoroethylene, trademark of Dupont)-coated hermetic stainless steel container and kept the container at 120° C. for 2 weeks. As the result, we found that the obtained electrolyte/membrane assembly III remains unchanged as well as the membrane/electrode assembly prepared from the expensive perfluorosulfonic membrane and the perfluorosulfonic electrolyte. The membrane itself is tough enough.

Similarly, we put said obtained membrane/electrode assembly III', and 20 ml of deionized water in a TEFLON (polytetrafluoroethylene, trademark of Dupont)-coated hermetic stainless steel container and kept the container at 120° C. for 2 weeks. As the result, we found that the membrane/electrode assembly III' has enough power generating performance although the electrode was partially separated.

Contrarily as shown by the comparative example 2-(3), the membrane/electrode assembly III prepared by comparatively cheap sulfonated aromatic hydrocarbon electrolyte IV and the electrode catalyst covering solution IV is broken and ragged under the same temperature and hydrolysis condition. In other words, the low-cost sulfopropyl polychlorotrifluoroethylene membrane/electrode assembly unlike the cheap sulfonated aromatic hydrocarbon membrane/electrode assembly III (see Comparative example 2-(3) is as stable as the expensive perfluorosulfonic membrane/electrolyte assembly, and satisfies both low cost and high performance.

(4) Evaluation of Output of the Unit Cells of a Fuel Cell.

Figure 4:
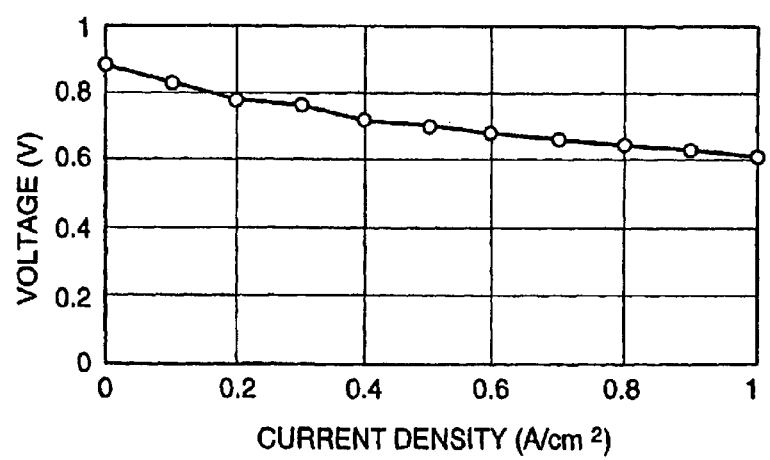
FIG. 4 shows a relationship between current density and output voltage of a unit cell of a solid polymer electrolyte fuel cell.

We evaluated the output performance of a fuel cell by dipping said membrane/electrode assemblies III and III' in deionized boiling water to let the assemblies absorb water and setting each wet membrane/electrode assembly in a sample unit. FIG. 4 shows a relationship between current density and voltage of a unit cell of a fuel cell containing membrane/electrode assembly III. The output voltage of the fuel cell is 0.6 V at a current density of 1 A/cm$^2$ and 0.76 V at a current density or 300 mA/$cm^2$. This fuel cell is fully available as a solid polymer electrolyte fuel cell.

Figure 5:
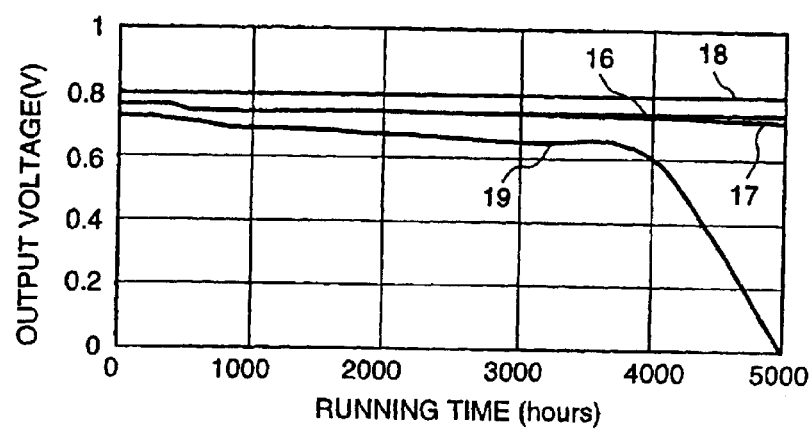
FIG. 5 shows the result of an endurance test of the unit cell of a solid polymer electrolyte fuel cell.

We prepared unit cells for solid polymer electrolyte fuel cells by respectively assembling the membrane/electrode assembies III and III' of Comparative example 2, thin carbon-paper packing materials (as supporting current collectors) at both sides of the assembly, and conductive separators (bipolar plates) provided at outer sides thereof and also working to separate the electrodes from the chamber and to flow gases to the electrodes into a unit cell for a solid polymer electrolyte fuel cell, and ran each unit cell for a long time at a current density of 300 mA/cm². FIG. 5 shows the relationship between the output voltage and the running time of the unit cell. The curve 16 in FIG. 5 is the result of the endurance test of the unit cell using the membrane/electrode assembly in accordance with the present invention. The curve 17 in FIG. 5 is the result of the endurance test of the unit cell using the membrane/electrode assembly III'. The curve 18 in FIG. 5 is the result of the endurance test of the unit cell using a perfluorosulfonic membrane/electrode assembly. As shown by curve 16 in FIG. 5, the output voltage of the unit cell is initially 0.76 V and keeps at 0.76 V even after the unit cell runs 5,000 hours, which is the same as the behavior of the output voltage of the unit cell using a perfluorosulfonic membrane (by curve 18). As shown by curve 19 in FIG. 5, the output voltage (of a unit cell using sulfonated aromatic hydrocarbon electrolyte of Comparative example 2 below) is initially 0.73 V but completely exhausted after the fuel cell runs 5000 hours.

Judging from these, it is apparent that the unit cell of a fuel cell using an aromatic hydrocarbon electrolyte having a sulfonic group bonded to the aromatic ring via an alkyl group is more durable than the unit cell of a fuel cell using an aromatic hydrocarbon electrolyte having a sulfonic group directly bonded to the aromatic ring. Further, although both membrane/electrode assemblies of Embodiment 2 and Comparative example 2 carry 0.25 mg/cm² of platinum, the output voltage of Embodiment 2 is greater than the output voltage of Comparative example 2. This is because the ion conductivities of the electrolyte and the electrode catalyst covering solution in the membrane/electrode assembly of Embodiment 2 are greater than those of the electrolyte and the electrode catalyst covering solution in the membrane/electrode assembly of Comparative example 2 and because the membrane/electrode assembly of Embodiment 2 is superior to the membrane/electrode assembly of Comparative example 2.

(5) Preparation of Fuel Cells

We piled up 36 unit cells which were prepared in (4) to form a solid polymer electrolyte fuel cell. This fuel cell outputs 3 KW.

COMPARATIVE EXAMPLE 2

(1) Preparation of Sulfonated Polyether Etherketone Sulfone

We prepared sulfonated polyether etherketone electrolyte by setting up a 500-ml 4-neck round bottom flask with a reflux condenser, a stirrer, a thermometer, and a desiccant tube (containing calcium chloride in it), substituting the air inside the flask by nitrogen gas, putting 6.7 g of polyether etherketone (PEEK) and 100 ml of 96% concentrated sulfuric acid in the flask, stirring the mixture at 60° C. for 60 minutes in the presence of nitrogen gas, adding oleum (containing 20% by weight SO3) to the solution while stirring the solution in the flow of nitrogen gas to make 98.5% by weight sulfuric acid, heating the solution at 80° C. for 30 minutes, dripping the reactant solution slowly into 15 liters of deionized water, filtering the deionized water to recover the precipitate (sulfonated polyether etherketone), repeating mixing the precipitate with deionized water and suction-filtering the mixture until the filtrate becomes neutral, and vacuum-drying the precipitate at 80° C. for one night. The ion exchange group equivalent weight of the obtained sulfonated polyether etherketone electrolyte is 600 g/mol.

We put 1.0 g of obtained sulfonated polyether etherketone electrolyte and 20 ml of deionized water in a TEFLON (polytetrafluoroethylene, trademark of Dupont)-coated hermetic stainless steel container, kept the container at 120° C. for 2 weeks, cooled the container and then measured the ion exchange group equivalent weight of sulfonated polyether etherketone. As the result, we found that the ion exchange group equivalent weight of sulfonated polyether etherketone electrolyte is 2,500 g/mol which is greater than the initial ion exchange group equivalent weight (960 g/mol). This means that the sulfonic groups are dissociated.

(2) Preparation of an Electrolyte Membrane

We prepared an electrolyte membrane by dissolving sulfonated polyether etherketone electrolyte obtained by the above description (1) into a mixture of 20 parts of N,N'-dimethylformamide, 80 parts of cyclohexanon, and 25 parts of methylethylketone so that the solution may contain 5% by weight of the product, spreading this solution over a glass plate by spin-coating, air-drying thereof, and vacuum-drying thereof at 80° C. The obtained electrolyte membrane IV is 45 μm thick and its ion exchange group equivalent is 0.02 S/cm.

We put said obtained electrolyte membrane IV and 20 ml of deionized water in a TEFLON (polytetrafluoroethylene, trademark of Dupont)-coated hermetic stainless steel container, kept the container at 120° C. for 2 weeks, cooled the container and then inspected thereof. As the result, we found the electrolyte membrane IV broken and ragged.

(3) Preparation of a Solution for Covering Electrode Catalyst and a Membrane/Electrode Assembly We prepared a paste (a solution IV for covering electrode catalyst) by adding a solvent mixture of N,N'-dimethylformamide, cyclohexanon, and methylethylketone which contains 5% by weight of the product (see (2)) to carbon carrying 40% by weight of platinum so that the ratio by weight of platinum catalyst and the polymer electrolyte might be 2:1, and dispersing the mixture uniformly. Next we prepared a membrane/electrode assembly IV by coating both sides of the electrolyte membrane IV (obtained by (2)) with said solution IV for covering electrode catalyst, and drying thereof. The obtained membrane/electrode assembly IV carries 0.25 mg/cm² of platinum.

We put said obtained membrane/electrode assembly IV and 20 ml of deionized water in a TEFLON (polytetrafluoroethylene, trademark of Dupont)-coated hermetic stainless steel container, kept the container at 120° C. for 2 weeks, cooled the container and then inspected thereof. As the result, we found the membrane/electrode assembly IV broken and ragged.

(4) Endurance Test of Unit Cells of a Fuel Cell

We prepared a unit cell for a solid polymer electrolyte fuel cell by assembling the membrane/electrode assembly IV of Comparative example 2, thin carbon-paper packing materials (as supporting current collectors) in close contact at both sides of the assembly, and conductive separators (bipolar plates) provided at outer sides thereof and also working to separate the electrodes from the chamber and to flow gases to the electrodes and ran the unit cell for a long time at a current density of 300 mA/cm². As the result, the output voltage of the unit cell was initially 0.73V but exhausted after a 5,000-hours run, as shown by the curve 19 in FIG. 5.

The cost of the sulfopropyl polyether etherketone electrolyte is one fortieth of the cost of perfluorosulfonic electrolyte which is prepared from expensive material in five processes because the sulfopropyl polyether etherketone electrolyte is prepared in a single process from polyether etherketone which is very cheap engineering plastics on-market.

As seen from Embodiment 2 and Comparative example 2-(1), the aromatic hydrocarbon electrolyte (Embodiment 2)

having a sulfonic group bonded to the aromatic ring via an alkyl group is more resistant to the hot deionized water (120° C.) than the aromatic hydrocarbon electrolyte (Comparative example 2) having a sulfonic group directly bonded to the aromatic ring.

Referring to Embodiment 1 and Comparative examples 2-(3), the electrode catalyst covering solution of Embodiment 2 is more suitable for the aromatic hydrocarbon membrane than the perfluorosulfonic electrode catalyst covering solution. Referring to Embodiment 2 and Comparative examples 2-(4), the output voltage of a unit cell using the electrode catalyst covering solution of Embodiment 2 is greater than the output voltage of a unit cell using the electrode catalyst covering solution of Comparative example 2. Therefore, the electrode catalyst covering solution of Embodiment 2 is superior to the electrode catalyst covering solution of Comparative example 2.

Referring to the curve 16 of FIG. 5, the output voltage of the unit cell of Embodiment 2 is initially 0.8 V and keeps at 0.8 V even after the unit cell runs 5,000 hours, which is the same as the behavior of the output voltage of the unit cell using a perfluorosulfonic membrane/electrode assembly (by curve 18). Contrarily, the output of curve 19 (for a unit cell of Comparative example 2) is initially 0.73 V and completely exhausted after the fuel cell runs 5000 hours. Judging from these, it is apparent that the unit cell of a fuel cell using an aromatic hydrocarbon electrolyte having a sulfonic group bonded to the aromatic ring via an alkyl group is more durable than the unit cell of a fuel cell using an aromatic hydrocarbon electrolyte having a sulfonic group directly bonded to the aromatic ring. Further, although both membrane/electrode assemblies of Embodiment 2 and Comparative examples 2 carry 0.25 mg/cm$^2$ of platinum, the output voltage of Embodiment 2 is greater than the output voltage of Comparative example 2. This is because the ion conductivities of the electrolyte and the electrode catalyst covering solution in the membrane/electrode assembly of Embodiment 2 are greater than those of the electrolyte and the electrode catalyst covering solution in the membrane/electrode assembly of Comparative example 2 and because the membrane/electrode assembly of Embodiment 2 is superior to the membrane/electrode assembly of Comparative example 2.

[Embodiment 3]

(1) Preparation of Sulfopropyl Poly-phenylene Sulfide

We prepared sulfopropyl poly-phenylene sulfide by setting up a 500-ml 4-neck round bottom flask with a reflux condenser, a stirrer, a thermometer, and a desiccant tube (containing calcium chloride in it), substituting the air inside the flask by nitrogen gas, putting 10.8 g of poly-phenylene sulfide (PPS), 12.2 g (0.1 mol) of propansultone and 50 ml of dry nitrobenzene in the flask, adding 14.7 g (0.11 mol) of aluminum chloride anhydride to the mixture gradually for 30 minutes while stirring thereof, refluxing the mixture for 10 hours after addition of aluminum chloride anhydride is completed, dripping the reactant solution slowly into 0.5 liter of deionized water, filtering the deionized water to recover the precipitate (sulfopropyl poly-phenylene sulfide), repeating mixing the precipitate with deionized water and suction-filtering the mixture until the filtrate becomes neutral, and vacuum-drying the precipitate at 120° C. for one night. The ion exchange group equivalent weight of the obtained sulfopropyl poly-phenylene sulfide is 520 g/mol.

The cost of the sulfopropyl poly-phenylene sulfide electrolyte is one fiftieth of the cost of perfluorosulfonic electrolyte which is prepared from expensive material in five processes because the sulfopropyl poly-phenylene sulfide electrolyte is prepared in a single process from polyphenylene sulfide which is very cheap engineering plastics on-market.

We put 1.0 g of obtained sulfopropyl poly-phenylene sulfide and 20 ml of deionized water in a TEFLON (polytetrafluoroethylene, trademark of Dupont)-coated hermetic stainless steel container, kept the container pt 120° C. for 2 weeks, cooled the container and then measured the ion exchange group equivalent weight of sulfopropyl poly-phenylene sulfide. As the result, we found that the ion exchange group equivalent weight of sulfopropyl poly-phenylene sulfide remains unchanged (520 g/mol) and that sulfopropyl poly-phenylene sulfide is as stable as the expensive perfluorosulfonic electrolyte. Contrarily as shown by the comparative example 3-(1) below, the cheap sulfonated aromatic hydrocarbon electrolyte is deteriorated under the same temperature and hydrolysis condition. Its ion exchange group equivalent increases up to 3,500 g/mol (which was initially 500 g/mol) and sulfon groups were dissociated. In other words, the low-cost sulfopropyl poly-phenylene sulfide electrolyte unlike the cheap sulfonated aromatic hydrocarbon electrolyte (see Comparative example 341)) shows very good chemical stability as well as the expensive perfluorosulfonic electrolyte, satisfying both low cost and high performance.

(2) Preparation of an Electrolyte Membrane

We prepared an electrolyte membrane V by dissolving the product (sulfopropyl poly-phenylene sulfide) obtained by the above description (1) into a solvent solution of N-methyl pyrolidone, spreading this solution over a glass plate by spin-coating, air-drying thereof, and vacuum-drying thereof at 80° C. The obtained electrolyte membrane V is 46 μm thick.

We put said obtained electrolyte membrane V and 20 ml of deionized water in a TEFLON (polytetrafluoroethylene, trademark of Dupont)-coated hermetic stainless steel container, kept the container at 120° C. for 2 weeks, cooled the container and then measured its ion exchange group equivalent weight. As the result, we found that the ion exchange group equivalent weight of the obtained electrolyte membrane remains unchanged as well as the expensive perfluorosulfonic electrolyte. The membrane itself is tough enough. Contrarily as shown by the comparative example 3-(2), the comparatively cheap sulfonated aromatic hydrocarbon electrolyte VI is broken and ragged under the same temperature and hydrolysis condition. In other words, the low-cost sulfopropyl poly-phenylene sulfide electrolyte unlike the cheap sulfonated aromatic hydrocarbon electrolyte IV (see Comparative example 3-(2)) shows very good chemical stability as well as the expensive perfluorosulfonic electrolyte, satisfying both low cost and high performance.

(3) Preparation of a Solution for Covering Electrode Catalyst and a Membrane/Electrode Assembly We prepared a solution V for covering electrode catalyst by adding a N-methylpyrolidone solution to carbon carrying 40% by weight of platinum so that the ratio by weight of platinum catalyst and the polymer electrolyte might be 2:1, and dispersing the mixture uniformly. Next we coated one side of the electrolyte membrane V (obtained by (2)) with said electrode catalyst covering solution V, and drying thereof. Further, we prepared a solution V' for covering electrode catalyst by adding a N-methylpyrolidone solution to carbon carrying 40% by weight of platinum-ruthenium alloy so that the ratio by weight of platinum-ruthenium alloy catalyst and the polymer electrolyte might be 2:1, and dispersing the mixture uniformly. Next we covered the other side of the membrane V (obtained by (2)) with said electrode catalyst covering solution V', and drying thereof. Thus we prepared a membrane/electrode assembly V having one side (oxygen electrode) of 0.25 mg/cm$^2$ of platinum and the other side (hydrogen electrode) of 0.3 mg/cm$^2$ of platinum-ruthenium alloy.

In the same manner but using the electrode catalyst covering solution VI of Comparative example 3, we prepared a membrane/electrode assembly V' having one side (oxygen electrode) of 0.25 mg/cm$^2$ of platinum and the other side (hydrogen electrode) of 0.3 mg/cm$^2$ of platinum-ruthenium alloy.

We prepared a paste (a solution for covering electrode catalyst) by adding an alcohol-water mixture of 5% by weight as perfluoro sulfonic electrolyte to carbon carrying 40% by weight of platinum so that the ratio by weight of platinum catalyst and the polymer electrolyte might be 2:1, and dispersing the mixture uniformly. Next we coated both sides of the electrolyte membrane V (obtained by (2)) with this paste (solution). However, the paste could not be uniformly spread over the electrolyte membrane and we could not get a membrane/electrode assembly. We put said obtained membrane/electrode assembly V and 20 ml of deionized water in a Teflon-coated hermetic stainless steel container and kept the container at 120° C. for 2 weeks. As the result, we found that the obtained electrolyte/membrane assembly V remains unchanged as well as the membrane/electrode assembly prepared from the expensive perfluorosulfonic membrane and the perfluorosulfonic electrolyte. The membrane itself is tough enough.

Similarly, we put said obtained membrane/electrode assembly V' and 20 ml of deionized water in a TEFLON (polytetrafluoroethylene, trademark of Dupont)-coated hermetic stainless steel container and kept the container at 120° C. for 2 weeks. As the result, we found that the membrane/electrode assembly V' has enough power generating performance although the electrode was partially separated.

Contrarily as shown by the comparative example 1-(3), the membrane/electrode assembly VI prepared by comparatively cheap sulfonated aromatic hydrocarbon electrolyte VI and the electrode catalyst covering solution VI is broken and ragged under the same temperature and hydrolysis condition. In other words, the low-cost sulfopropyl polyphenylene sulfide membrane/electrode assembly unlike the cheap sulfonated aromatic hydrocarbon membrane/electrode assembly (see Comparative example 3-(3) is as stable as the expensive perfluorosulfonic membrane/electrolyte assembly, and satisfies both low cost and high performance.

(4) Evaluation of Output of the Unit Cells of a Fuel Cell

Figure 6:
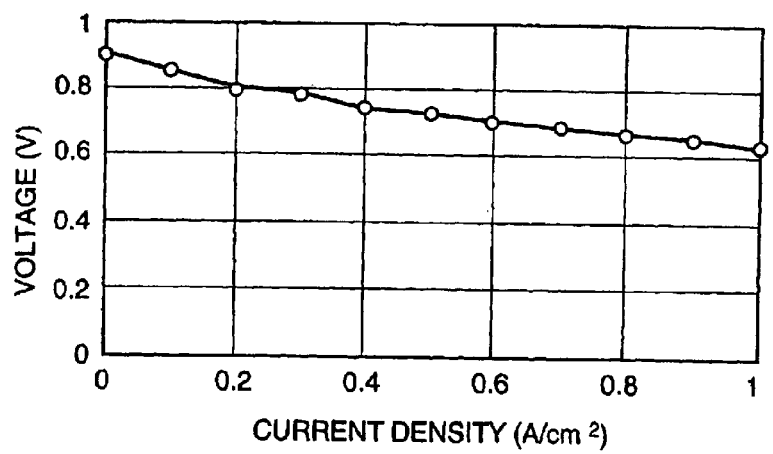
FIG. 6 shows a relationship between current density and output voltage of a unit cell of a solid polymer electrolyte fuel cell.

We evaluated the output performance of a fuel cell by dipping said membrane/electrode assembly in deionized boiling water to let the assembly absorb water and setting the wet membrane/electrode assembly in a sample unit. FIG. 6 shows a relationship between current density and voltage of a unit cell of a fuel cell containing membrane/electrode assembly VI. The output voltage of the fuel cell is 0.63 V at a current density of 1 A/cm$^2$ and 0.78 V at a current density or 300 mA/cm$^2$. This fuel cell is fully available as a solid polymer electrolyte fuel cell.

Figure 7:
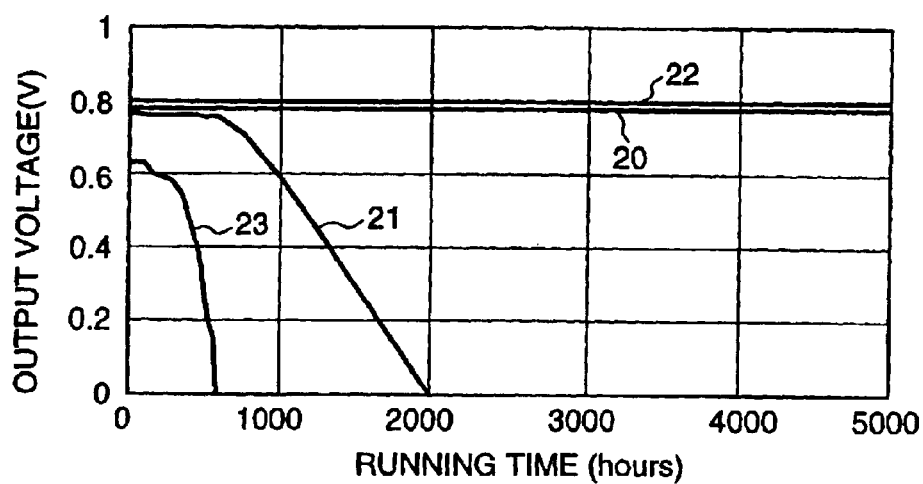
FIG. 7 shows the result of an endurance test of the unit cell of a solid polymer electrolyte fuel cell.

We ran the unit cell of said solid polymer electrolyte fuel cell for a long time at a current density of 300 mA/cm$^2$. FIG. 7 shows the relationship between the output voltage and the running time of the unit cell. The curve 20 in FIG. 7 is the result of the endurance test of the unit cell using the membrane/electrode assembly V in accordance with the present invention. The curve 21 in FIG. 7 is the result of the endurance test of the unit cell using the membrane/electrode assembly V'. The curve 22 in FIG. 7 is the result of the endurance test of the unit cell using a perfluorosulfonic membrane/electrode assembly. As shown by curve 20 in FIG. 7, the output voltage of the unit cell is initially 0.78 V and keeps at 0.78 V even after the unit cell runs 5,000 hours, which is the same as the behavior of the output voltage of the unit cell using a perfluorosulfonic membrane (by curve 22). As shown by curve 23 in FIG. 7, the output voltage (of a unit cell using sulfonated aromatic hydrocarbon electrolyte of Comparative example 3 below) is initially 0.63 V but completely exhausted after the fuel cell runs 600 hours. Judging from these, it is apparent that the unit cell of a fuel cell using an aromatic hydrocarbon electrolyte having a sulfonic group bonded to the aromatic ring via an alkyl group is more durable than the unit cell of a fuel cell using an aromatic hydrocarbon electrolyte having a sulfonic group directly bonded to the aromatic ring.

Further, although both membrane/electrode assemblies of Embodiment 3 and Comparative example 3 carry 0.25 mg/cm$^2$ of platinum, the output voltage of Embodiment 3 is greater than the output voltage of Comparative example 3. This is because the ion conductivities of the electrolyte and the electrode catalyst covering solution in the membrane/electrode assembly of Embodiment 3 are greater than those of the electrolyte and the electrode catalyst covering solution in the membrane/electrode assembly of Comparative example 3 and because the membrane/electrode assembly of Embodiment 3 is superior to the membrane/electrode assembly of Comparative example 3.

(5) Preparation of Fuel Cells

We piled up 36 unit cells which were prepared in (4) to form a solid polymer electrolyte fuel cell. This fuel cell outputs 3 KW.

COMPARATIVE EXAMPLE 3

(1) Preparation of Sulfonated Poly-phenylene Sulfide

We prepared sulfonated poly-phenylene sulfide by setting up a 500-ml 4-neck round bottom flask with a reflux condenser, a stirrer, a thermometer, and a desiccant tube (containing calcium chloride in it), substituting the air inside the flask by nitrogen gas, putting 12 g of poly-phenylene sulfide (PPS) and 220 ml of chlorosulfuric acid, stirring the mixture for 30 minutes at 5° C. in the flow of a nitrogen gas to dissolve PPS, keeping still at 20° C. for 150 minutes and at 50° C. for 60 minutes, dripping the reactant solution slowly into 15 liters of deionized water, filtering the deionized water to recover the precipitate (sulfonated poly-phenylene sulfide), repeating mixing the precipitate with deionized water and suction-filtering the mixture until the filtrate becomes neutral, and vacuum-drying the precipitate at 80° C. for one night. The ion exchange group equivalent weight of the obtained sulfonated poly-phenylene sulfide is 500 g/mol.

We put 1.0 g of obtained sulfonated poly-phenylene sulfide and 20 ml of deionized water in a TEFLON (polytetrafluoroethylene, trademark of Dupont)-coated hermetic stainless steel container, kept the container at 120° C. for 2 weeks, cooled the container and then measured the ion exchange group equivalent weight of sulfonated poly-phenylene sulfide. As the result, we found that the ion exchange group equivalent weight of sulfonated poly-phenylene sulfide is 3,500 g/mol which is greater than the initial ion exchange group equivalent weight. This means that the sulfonic groups are dissociated.

(2) Preparation of an Electrolyte Membrane

We prepared a sulfonated poly-phenylene sulfide electrolyte membrane by dissolving sulfonated poly-phenylene sulfide electrolyte obtained by the above description (1) into a mixture of 20 parts of N,N'-dimethylformamide, 80 parts of cyclohexanon, and 25 parts of methylethylketone, spreading this solution over a glass plate by spin-coating, air-drying thereof, and vacuum-drying thereof at 80° C. The obtained sulfonated poly-phenylene sulfide electrolyte membrane VI is 45 μm thick and its ion exchange group equivalent is 0.02 S/cm.

We put said sulfonated poly-phenylene sulfide electrolyte membrane VI and 20 ml of deionized water in a TEFLON (polytetrafluoroethylene, trademark of Dupont)-coated hermetic stainless steel container and kept the container at 120° C. for 2 weeks. As the result, we found the sulfonated poly-phenylene sulfide electrolyte membrane VI broken and ragged.

(3) Preparation of a Solution for Covering Electrode Catalyst and a Membrane/Electrode Assembly We prepared a paste (a solution VI for covering electrode catalyst) by adding a solvent mixture of N,N'-dimethylformamide, cyclohexanon, and methylethylketone which contains 5% by weight of the product (see (2)) to carbon carrying 40% by weight of platinum so that the ratio by weight of platinum catalyst and the polymer electrolyte might be 2:1, and dispersing the mixture uniformly. Next we prepared a membrane/electrode assembly VI by coating both sides of the electrolyte membrane VI (obtained by (2)) with said solution VI for covering electrode catalyst, and drying thereof. The obtained membrane/electrode assembly IV carries 0.25 mg/cm$^2$ of platinum.

We put said obtained membrane/electrode assembly VI and 20 ml of deionized water in a Teflon-coated hermetic stainless steel container, kept the container at 120° C. for 2 weeks, cooled the container and then inspected thereof. As the result, we found the membrane/electrode assembly VI broken and ragged.

(4) Endurance Test of Unit Cells of a Fuel Cell

We prepared a unit cell for a solid polymer electrolyte fuel cell by assembling the membrane/electrode assembly VI of Comparative example 3, thin carbon-paper packing materials (as supporting current collectors) in close contact at both sides of the assembly, and conductive separators (bipolar plates) provided at outer sides thereof and also working to separate the electrodes from the chamber and to flow gases to the electrodes and ran the unit cell for a long time at a current density of 300 mA/cm$^2$.

As the result, the output voltage of the unit cell was initially 0.63 V but exhausted after a 600-hours run, as shown by the curve 23 in FIG. 7.

The cost of the sulfonated poly-phenylene sulfide electrolyte is one fiftieth of the cost of perfluorosulfonic electrolyte which is prepared from expensive material in five processes because the sulfonated poly-phenylene sulfide electrolyte is prepared in a single process from poly-phenylene sulfide which is very cheap engineering plastics on-market.

As seen from Embodiment 3 and Comparative example 3-(1), the aromatic hydrocarbon electrolyte (Embodiment 3) having a sulfonic group bonded to the aromatic ring via an alkyl group is more resistant to the hot deionized water (120° C.) than the aromatic hydrocarbon electrolyte (Comparative example 3) having a sulfonic group directly bonded to the aromatic ring.

Referring to Embodiment 3 and Comparative examples 3-(1) and 3-(2), although the ion exchange group equivalent weight (520 g/mol) of Embodiment 3 (aromatic hydrocarbon electrolyte having a sulfonic group bonded to the aromatic ring via an alkyl group) is a little greater than that (500 g/mol) of Comparative example 3 (aromatic hydrocarbon electrolyte having a sulfonic group directly bonded to the aromatic ring), the ion conductivity of the electrolyte membrane of Embodiment 3 is greater than the ion conductivity of the electrolyte membrane of Comparative example 3. (Usually the ion conductivity of an electrolyte membrane is greater as the ion exchange group equivalent weight of the electrolyte membrane is smaller.) Therefore the electrolyte membrane of Embodiment 3 is superior to that of Comparative example 3.

Referring to Embodiment 3 and Comparative examples 3-(3), the electrode catalyst covering solution of Embodiment 3 is more suitable for the aromatic hydrocarbon membrane than the perfluorosulfonic electrode catalyst covering solution. Referring to Embodiment 3 and Comparative examples 3-(4), the output voltage of a unit cell using the electrode catalyst covering solution of Embodiment 3 is greater than the output voltage of a unit cell using the electrode catalyst covering solution of Comparative example 3. Therefore, the electrode catalyst covering solution of Embodiment 3 is superior to the electrode catalyst covering solution of Comparative example 3.

Referring to the curve 20 of FIG. 7, the output voltage of the unit cell of Embodiment 3 is initially 0.78 V and keeps at 0.78 V even after the unit cell runs 5,000 hours, which is the same as the behavior of the output voltage of the unit cell using a perfluorosulfonic membrane/electrode assembly (by curve 22). Contrarily, the output of curve 23 (for a unit cell of Comparative example 3) is initially 0.63 V and completely exhausted after the fuel cell runs 600 hours. Judging from these, it is apparent that the unit cell of a fuel cell using an aromatic hydrocarbon electrolyte having a sulfonic group bonded to the aromatic ring via an alkyl group is more durable than the unit cell of a fuel cell using an aromatic hydrocarbon electrolyte having a sulfonic group directly bonded to the aromatic ring. Further, although both membrane/electrode assemblies of Embodiment 3 and Comparative examples 3 carry 0.25 mg/cm$^2$ of platinum, the output voltage of Embodiment 3 is greater than the output voltage of Comparative example 3. This is because the ion conductivities of the electrolyte and the electrode catalyst covering solution in the membrane/electrode assembly of Embodiment 3 are greater than those of the electrolyte and the electrode catalyst covering solution in the membrane/electrode assembly of Comparative example 3 and because the membrane/electrode assembly of Embodiment 3 is superior to the membrane/electrode assembly of Comparative example 3.

[Embodiment 4]

(1) Preparation of Sulfopropyl Reformed Polyphenylene Oxide

We prepared sulfopropyl reformed polyphenylene oxide by setting up a 500-ml 4-neck round bottom flask with a reflux condenser, a stirrer, a thermometer, and a desiccant tube (containing calcium chloride in it), substituting the air inside the flask by nitrogen gas, putting 12.0 g of polyphe-nylene oxide (m-PPE), 12.2 g (0.1 mol) of propansultone and 50 ml of dimethyl sulfoxide, adding 14.7 g (0.11 mol) of aluminum chloride anhydride to the mixture gradually for 30 minutes while stirring thereof, keeping the mixture at 150° C. for 8 hours, dripping the reactant solution into 500 ml of iced water containing 25 ml of concentrated hydrochloric acid to stop the reaction, separating the organic precipitate, washing thereof, neutralizing thereof with an aqueous solution of sodium carbonate containing a few drops of octyl alcohol, separating aluminum hydroxide by filtration, decoloring the filtrate by active carbon, and evaporating the solvent. The ion exchange group equivalent weight of the obtained sulfopropyl reformed polyphenylene oxide is 370 g/mol. The cost of the sulfopropyl polyphenylene oxide electrolyte is one fiftieth of the cost of perfluorosulfonic electrolyte which is prepared from expensive material in five processes because the sulfopropyl polyphenylene oxide electrolyte is prepared in a single process from polyphenylene oxide which is very cheap engineering plastics on-market.

We put 1.0 g of said sulfopropyl reformed polyphenylene oxide and 20 ml of deionized water in a TEFLON (polytetrafluoroethylene, trademark of Dupont)-coated hermetic stainless steel container, kept the container at 120° C. for 2 weeks, cooled the container and then measured the ion exchange group equivalent weight of the sulfopropyl reformed polyphenylene oxide electrolyte. As the result, we found that the ion exchange group equivalent weight of sulfopropyl reformed polyphenylene oxide remains unchanged (520 g/mol) and that sulfopropyl reformed polyphenylene oxide is as stable as the expensive perfluorosulfonic electrolyte. Contrarily as shown by the comparative example 4-(1) below, the cheap sulfonated aromatic hydrocarbon electrolyte is deteriorated under the same temperature and hydrolysis condition. Its ion exchange group equivalent increases up to 3,500 g/mol (which was initially 490 g/mol) and sulfone groups were dissociated. In other words, the low-cost sulfopropyl reformed polyphenylene oxide electrolyte unlike the cheap sulfonated aromatic hydrocarbon electrolyte (see Comparative example 4-(1)) shows very good chemical stability as well as the expensive perfluorosulfonic electrolyte, satisfying both low cost and high performance.

(2) Preparation of an Electrolyte Membrane

We prepared a sulfopropyl reformed polyphenylene oxide electrolyte membrane by dissolving sulfopropyl reformed polyphenylene oxide electrolyte obtained by the above description (1) into a mixture of 20 parts of N,N'-dimethylformamide, 80 parts of cyclohexanon, and 25 parts of methylethylketone so that the solution may contain 5% by weight of the product, spreading this solution over a glass plate by spin-coating, air-drying thereof, and vacuum-drying thereof at 80° C. The obtained sulfopropyl reformed polyphenylene oxide electrolyte membrane VII is 42 $\mu$m thick and its ion exchange group equivalent is 0.01 S/cm.

We put said obtained electrolyte membrane VII and 20 ml of deionized water in a TEFLON (polytetrafluoroethylene, trademark of Dupont)-coated hermetic stainless steel container and kept the container at 120° C. for 2 weeks. As the result, we found that the ion exchange group equivalent weight of the obtained electrolyte membrane remains unchanged as well as the expensive perfluorosulfonic electrolyte. The membrane itself is tough enough. Contrarily as shown by the comparative example 4-(2), the comparatively cheap sulfonated aromatic hydrocarbon electrolyte VIII is broken and ragged under the same temperature and hydrolysis condition. In other words, the low-cost sulfopropyl reformed polyphenylene oxide electrolyte unlike the cheap sulfonated aromatic hydrocarbon electrolyte (see Comparative example 4-(2)) shows very good chemical stability as well as the expensive perfluorosulfonic electrolyte, satisfying both low cost and high performance.

(3) Preparation of a Solution for Covering Electrode Catalyst and a Membrane/Electrode Assembly We prepared a paste (a solution VII for covering electrode catalyst) by adding a solvent mixture of N,N'-dimethylformamide, cyclohexanon, and methylethylketone which contains 5% by weight of the product (see (2)) to carbon carrying 40% by weight of platinum so that the ratio by weight of platinum catalyst and the polymer electrolyte might be 2:1, and dispersing the mixture uniformly. Next we prepared a membrane/electrode assembly IV by coating both sides of the electrolyte membrane VII (obtained by (2)) with said solution VII for covering electrode catalyst, and drying thereof. The obtained membrane/electrode assembly VII carries 0.25 mg/cm$^2$ of platinum.

We put said obtained membrane/electrode assembly VI and 20 ml of deionized water in a TEFLON (polytetrafluoroethylene, trademark of Dupont)-coated hermetic stainless steel container and kept the container at 120° C. for 2 weeks. As the result, we found that the obtained electrolyte/membrane assembly VI remains unchanged as well as the membrane/electrode assembly prepared from the expensive perfluorosulfonic membrane and the perfluorosulfonic electrolyte. The membrane itself is tough enough.

Contrarily as shown by the comparative example 4-(3), the membrane/electrode assembly VIII prepared by comparatively cheap sulfonated aromatic hydrocarbon electrolyte VIII and the electrode catalyst covering solution VIII is broken and ragged under the same temperature and hydrolysis condition. In other words, the low-cost sulfopropyl reformed polyphenylene oxide membrane/electrode assembly unlike the cheap sulfonated aromatic hydrocarbon membrane/electrode assembly (see Comparative example 4-(3)) is as stable as the expensive perfluorosulfonic membrane/electrolyte assembly, and satisfies both low cost and high performance.

(4) Evaluation of Output of the Unit Cells of a Fuel Cell

Figure 8:
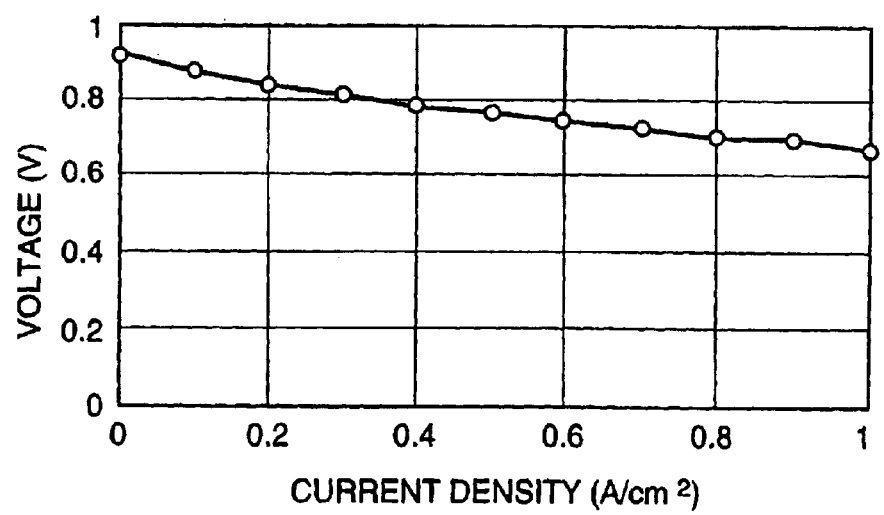
FIG. 8 shows a relationship between current density and output voltage of a unit cell of a solid polymer electrolyte fuel cell.
Figure 9:
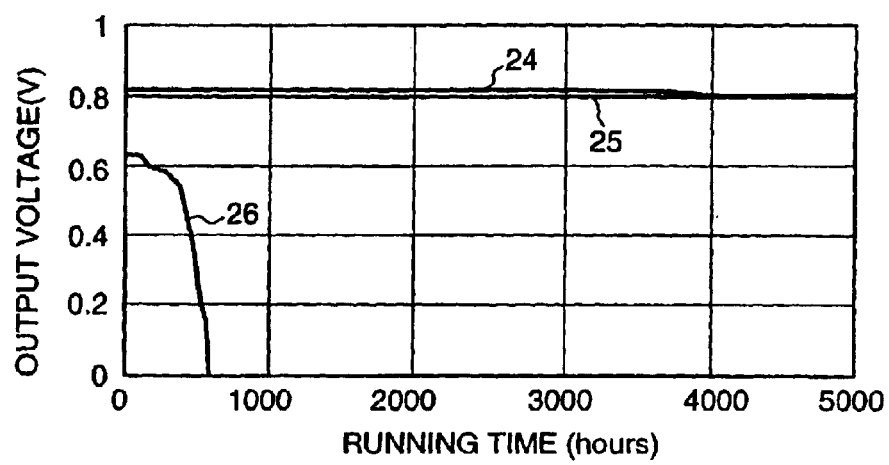
FIG. 9 shows the result of an endurance test of the unit cell of a solid polymer electrolyte fuel cell.

We evaluated the output performance of a fuel cell by dipping said membrane/electrode assembly VII in deionized boiling water to let the assembly absorb water and setting the wet membrane/electrode assembly in a sample unit. FIG. 8 shows a relationship between current density and voltage of a unit cell of a fuel cell containing membrane/electrode assembly VII. The output voltage of the fuel cell is 0.69 V at a current density of 1 A/cm$^2$ and 0.82 V at a current density or 300 mA/cm$^2$. This fuel cell is fully available as a solid polymer electrolyte fuel cell. We ran said unit cell for a long time at a current density of 300 mA/cm$^2$. FIG. 9 shows the relationship between the output voltage and the running time of the unit cell. The curve 24 in FIG. 9 is the result of the endurance test of the unit cell using the membrane/electrode assembly VII in accordance with the present invention. The curve 25 in FIG. 9 is the result of the endurance test of the unit cell using a perfluorosulfonic membrane/electrode assembly. As shown by curve 24 in FIG. 9, the output voltage of the unit cell is initially 0.82 V and keeps at the voltage level even after the unit cell runs 5,000 hours, which is the same as the behavior of the output voltage of the unit cell using a perfluorosulfonic membrane (by curve 25). As shown by curve 26 in FIG. 9, the output voltage (of a unit cell using sulfonated aromatic hydrocarbon electrolyte of Comparative example 4 below) is initially 0.63 V but completely exhausted after the fuel cell runs 600 hours. Judging from these, it is apparent that the unit cell of a fuel cell using an aromatic hydrocarbon electrolyte having a sulfonic group bonded to the aromatic ring via an alkyl group is more durable than the unit cell of a fuel cell using an aromatic hydrocarbon electrolyte having a sulfonic group directly bonded to the aromatic ring. Further, although both membrane/electrode assemblies of Embodiment 4 and Comparative example 4 carry 0.25 mg/cm$^2$ of platinum, the output voltage of Embodiment 4 is greater than the output voltage of Comparative example 4. This is because the ion conductivities of the electrolyte and the electrode catalyst covering solution in the membrane/electrode assembly of Embodiment 4 are greater than those of the electrolyte and the electrode catalyst covering solution in the membrane/electrode assembly of Comparative example 4 and because the membrane/electrode assembly of Embodiment 2 is superior to the membrane/electrode assembly of Comparative example 4.

(5) Preparation of Fuel Cells

We piled up 36 unit cells which were prepared in (4) to form a solid polymer electrolyte fuel cell. This fuel cell outputs 3 KW.

COMPARATIVE EXAMPLE 4

(1) Preparation of Sulfonated Reformed Poly-phenylene Oxide

We prepared sulfonated reformed poly-phenylene oxide by setting up a 500-ml 4-neck round bottom flask with a reflux condenser, a stirrer, a thermometer, and a desiccant tube (containing calcium chloride in it), substituting the air inside the flask by nitrogen gas, putting 12 g of poly-phenylene oxide (m-PPE) and 220 ml of chlorosulfuric acid, stirring the mixture for 30 minutes at 5° C. in the flow of a nitrogen gas to dissolve PPS, keeping still at 20° C. for 150 minutes and at 50° C. for 60 minutes, dripping the reactant solution slowly into 15 liters of deionized water, filtering the deionized water to recover the precipitate (sulfonated reformed poly-phenylene oxide), repeating mixing the precipitate with deionized water and suction-filtering the mixture until the filtrate becomes neutral, and vacuum-drying the precipitate at 80° C. for one night. The ion exchange group equivalent weight of the obtained sulfonated reformed poly-phenylene oxide is 490 g/mol.

We put 1.0 g of obtained sulfonated reformed poly-phenylene oxide electrolyte and 20 ml of deionized water in a TEFLON (polytetrafluoroethylene, trademark of Dupont)-coated hermetic stainless steel container, kept the container at 120° C. for 2 weeks, cooled the container and then measured the ion exchange group equivalent weight of the sulfonated reformed poly-phenylene oxide electrolyte. As the result, we found that the ion exchange group equivalent weight of sulfonated reformed poly-phenylene oxide is 3,500 g/mol which is greater than the initial ion exchange group equivalent weight. This means that the sulfonic groups are dissociated.

(2) Preparation of an Electrolyte Membrane

We prepared a sulfonated reformed poly-phenylene oxide electrolyte membrane by dissolving the product obtained by the above procedure (1) into a mixture of 20 parts of N,N'-dimethylformamide, 80 parts of cyclohexanon, and 25 parts of methylethylketone so that the solution may contain 5% by weight of the product, spreading this solution over a glass plate by spin-coating, air-drying thereof, and vacuum-drying thereof at 80° C. The obtained sulfonated reformed poly-phenylene oxide electrolyte membrane VIII is 45 μm thick and its ion exchange group equivalent is 0.02 S/cm.

We put said sulfonated reformed poly-phenylene oxide electrolyte membrane VII1 and 20 ml of deionized water in a TEFLON (polytetrafluoroethylene, trademark of Dupont)-coated hermetic stainless steel container and kept the container at 120° C. for 2 weeks. As the result, we found the sulfonated reformed poly-phenylene oxide electrolyte membrane VIII broken and ragged.

(3) Preparation of a Solution for Covering Electrode Catalyst and a Membrane/Electrode Assembly We prepared a paste (a solution VIII for covering electrode catalyst) by adding a solvent mixture of N,N'-dimethylformamide, cyclohexanon, and methylethylketone which contains 5% by weight of the product (see (2)) to carbon carrying 40% by weight of platinum so that the ratio by weight of platinum catalyst and the polymer electrolyte might be 2:1, and dispersing the mixture uniformly. Next we prepared a membrane/electrode assembly VIII by coating both sides of the sulfonated reformed poly-phenylene oxide electrolyte membrane VIII (obtained by (2)) with said electrode covering solution VII, and drying thereof. The obtained membrane/electrode assembly VIII carries 0.25 mg/cm$^2$ of platinum.

We put said obtained membrane/electrode assembly VIII and 20 ml of deionized water in a TEFLON (polytetrafluoroethylene, trademark of Dupont)-coated hermetic stainless steel container and kept the container at 120° C. for 2 weeks. As the result, we found the membrane/electrode assembly VIII broken and ragged.

(4) Endurance Test of Unit Cells of a Fuel Cell

We prepared a unit cell for a solid polymer electrolyte fuel cell by assembling the membrane/electrode assembly VIII of Comparative example 4, thin carbon-paper packing materials (as supporting current collectors) in close contact at both sides of the assembly, and conductive separators (bipolar plates) provided at outer sides thereof and also working to separate the electrodes from the chamber and to flow gases to the electrodes and ran the unit cell for a long time at a current density of 300 mA/cm$^2$. As the result, the output voltage of the unit cell was initially 0.63V but exhausted after a 600-hours run, as shown by the curve 26 in FIG. 9.

The cost of the sulfopropylated poly-phenylene oxide electrolyte is one fiftieth of the cost of perfluorosulfonic electrolyte which is prepared from expensive material in five processes because the sulfopropylated poly-phenylene oxide electrolyte electrolyte is prepared in a single process from poly-phenylene oxide which is very cheap engineering plastics on-market.

As seen from Embodiment 4 and Comparative example 4-(1), the aromatic hydrocarbon electrolyte (Embodiment 4) having a sulfonic group bonded to the aromatic ring via an alkyl group is more resistant to the hot deionized water (120° C.) than the aromatic hydrocarbon electrolyte (Comparative example 3) having a sulfonic group directly bonded to the aromatic ring.

Referring to Embodiment 4 and Comparative examples 4-(1) and 4-(2), although the ion exchange group equivalent weight (520 g/mol) of Embodiment 4 (aromatic hydrocarbon electrolyte having a sulfonic group bonded to the aromatic ring via an alkyl group) is a little greater than that (490 g/mol) of Comparative example 4 (aromatic hydrocarbon electrolyte having a sulfonic group directly bonded to the aromatic ring), the ion conductivity of the electrolyte membrane of Embodiment 4 is greater than the ion conductivity of the electrolyte membrane of Comparative example 4. (Usually the ion conductivity of an electrolyte membrane is greater as the ion exchange group equivalent weight of the electrolyte membrane is smaller.) Therefore the electrolyte membrane of Embodiment 4 is superior to that of Comparative example 4.

Referring to Embodiment 4 and Comparative examples 4-(3), the electrode catalyst covering solution of Embodiment 4 is more suitable for the aromatic hydrocarbon membrane than the perfluorosulfonic electrode catalyst covering solution.

Referring to Embodiment 4 and Comparative examples 4-(4), the output voltage of a unit cell using the electrode catalyst covering solution of Embodiment 4 is greater than the output voltage of a unit cell using the electrode catalyst covering solution of Comparative example 4. Therefore, the electrode catalyst covering solution of Embodiment 4 is superior to the electrode catalyst covering solution of Comparative example 4.

Referring to the curve 24 of FIG. 9, the output voltage of the unit cell of Embodiment 4 is initially 0.82 V and keeps at the same voltage level even after the unit cell runs 5,000 hours, which is the same as the behavior of the output voltage of the unit cell using a perfluorosulfonic membrane/electrode assembly (by curve 25). Contrarily, the output of curve 26 (for a unit cell of Comparative example 4) is initially 0.63 V and completely exhausted after the fuel cell runs 600 hours. Judging from these, it is apparent that the unit cell of a fuel cell using an aromatic hydrocarbon electrolyte having a sulfonic group bonded to the aromatic ring via an alkyl group is more durable than the unit cell of a fuel cell using an aromatic hydrocarbon electrolyte having a sulfonic group directly bonded to the aromatic ring. Further, although both membrane/electrode assemblies of Embodiment 4 and Comparative examples 4 carry 0.25 mg/cm$^2$ of platinum, the output voltage of Embodiment 4 is greater than the output voltage of Comparative example 4. This is because the ion conductivities of the electrolyte and the electrode catalyst covering solution in the membrane/electrode assembly of Embodiment 4 are greater than those of the electrolyte and the electrode catalyst covering solution in the membrane/electrode assembly of Comparative example 4 and because the membrane/electrode assembly of Embodiment 4 is superior to the membrane/electrode assembly of Comparative example 4.

[Embodiment 5]

(1) Preparation of Sulfopropylated Polyether Sulfone

We prepared sulfopropylated polyether sulfone by setting up a 500-ml 4-neck round bottom flask with a reflux condenser, a stirrer, a thermometer, and a desiccant tube (containing calcium chloride in it), substituting the air inside the flask by nitrogen gas, putting 11.6 g of polyether sulfone (PES), 12.2 g (0.1 mol) of propanesultone and 50 ml of dry acetophenone in the flask, adding 14.7 g (0.11 mol) of aluminum chloride anhydride to the mixture gradually for 30 minutes while stirring thereof, refluxing the mixture for 8 hours after addition of aluminum chloride anhydride is completed, dripping the reactant solution slowly into 0.5 liter of deionized water, filtering the deionized water to recover the precipitate (sulfopropylated polyether sulfone), repeating mixing the precipitate with deionized water and suction-filtering the mixture until the filtrate becomes neutral, and vacuum-drying the precipitate at 120° C. for one night. The ion exchange group equivalent weight of the obtained sulfopropylated polyether sulfone is 700 g/mol.

The cost of the sulfopropylated polyether sulfone electrolyte is one fiftieth or under of the cost of perfluorosulfonic electrolyte which is prepared from expensive material in five processes because the sulfopropylated polyether sulfone electrolyte is prepared in a single process from poly-ether sulfone which is very cheap engineering plastics on-market.

We put 1.0 g of obtained sulfopropylated polyether sulfone and 20 ml of deionized water in a TEFLON (polytetrafluoroethylene, trademark of Dupont)-coated hermetic stainless steel container, kept the container at 120° C. for 2 weeks, cooled the container and then measured the ion exchange group equivalent weight of sulfopropylated polyether sulfone. As the result, we found that the ion exchange group equivalent weight of sulfopropylated polyether sulfone remains unchanged (700 g/mol) and that sulfopropylated polyether sulfone is as stable as the expensive perfluorosulfonic electrolyte. Contrarily as shown by the comparative example 1-(1) below, the cheap sulfonated aromatic hydrocarbon electrolyte is deteriorated under the same temperature and hydrolysis condition. Its ion exchange group equivalent increases up to 3,000 g/mol (which was initially 960 g/mol) and sulfone groups were dissociated. In other words, the low-cost sulfopropylated polyether sulfone electroly4e unlike the cheap sulfonated aromatic hydrocarbon electrolyte (see Comparative example 1-(1)) shows very good chemical stability as well as the expensive perfluorosulfonic electrolyte, satisfying both low cost and high performance.

(2) Preparation of an Electrolyte Membrane

We prepared an electrolyte membrane IX by dissolving the product obtained by the above procedure (1) into a solvent solution of N,N'-dimethyl formamide, spreading this solution over a glass plate by spin-coating, air-drying thereof, and vacuum-drying thereof at 80° C. The obtained electrolyte membrane IX is 40 μm thick.

We put said obtained electrolyte membrane IX and 20 ml of deionized water in a TEFLON (polytetrafluoroethylene, trademark of Dupont)-coated hermetic stainless steel container and kept the container at 120° C. for 2 weeks. As the result, we found that the ion exchange group equivalent weight of the obtained electrolyte membrane IX remains unchanged as well as the expensive perfluorosulfonic electrolyte. The membrane itself is tough enough. Contrarily as shown by the comparative example 1-(2), the comparatively cheap sulfonated aromatic hydrocarbon electrolyte II is broken and ragged under the same temperature and hydrolysis condition. In other words, the low-cost sulfopropyl polyathersulfone electrolyte unlike the cheap sulfonated aromatic hydrocarbon electrolyte (see Comparative example 1-(2)) shows very good chemical stability as well as the expensive perfluorosulfonic electrolyte, satisfying both low cost and high performance.

(3) Preparation of a Solution for Covering Electrode Catalyst and a Membrane/Electrode Assembly We prepared a solution IX for covering electrode catalyst by adding a N,N'-dimethyl formamide solution to carbon carrying 40% by weight of platinum so that the ratio by weight of platinum catalyst and the polymer electrolyte might be 2:1, and dispersing the mixture uniformly. Next we coated one side of the electrolyte membrane IX (obtained by (2)) with said electrode catalyst covering solution IX, and drying thereof. Further, we prepared a solution IX' for covering electrode catalyst by adding a N,N'-dimethyl formamide solution to carbon carrying 40% by weight of platinum-ruthenium alloy so that the ratio by weight of platinum-ruthenium alloy catalyst and the polymer electrolyte might be 2:1, and dispersing the mixture uniformly. Next we covered the other side of the membrane IX (obtained by (2)) with said electrode catalyst covering solution IX', and drying thereof. Thus we prepared a membrane/electrode assembly IX having one side (oxygen electrode) of 0.29 mg/cm$^2$ of platinum and the other side (hydrogen electrode) of 0.32 mg/cm$^2$ of platinum-ruthenium alloy.

We put said obtained membranelelectrode assembly IX and 20 ml of deionized water in a TEFLON (polytetrafluoroethylene, trademark of Dupont)-coated hermetic stainless steel container and kept the container at 120° C. for 2 weeks. As the result, we found that the obtained electrolyte/membrane assembly IX remains unchanged as well as the membrane/electrode assembly prepared from the expensive perfluorosulfonic membrane and the perfluorosulfonic electrolyte. The membrane itself is tough enough.

Contrarily as shown by the comparative example 1-(3), the membrane/electrode assembly II prepared by comparatively cheap sulfonated aromatic hydrocarbon electrolyte II and the electrode catalyst covering solution II is broken and ragged under the same temperature and hydrolysis condition. In other words, the low-cost sulfopropylated polyether sulfone membrane/electrode assembly unlike the cheap sulfonated aromatic hydrocarbon membrane/electrode assembly (see Comparative example 1-(3) is as stable as the expensive perfluorosulfonic membrane/electrolyte assembly, and satisfies both low cost and high performance.

(4) Evaluation of Output of the Unit Cells of a Fuel Cell

Figure 10:
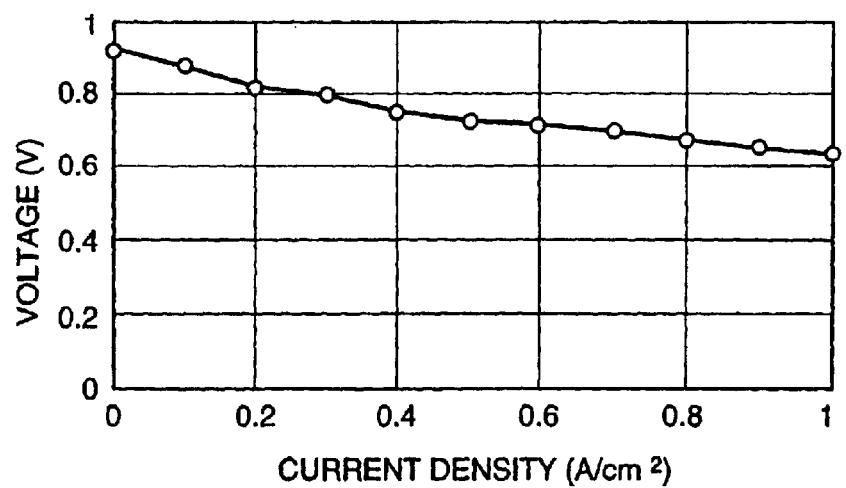
FIG. 10 shows a relationship between current density and output voltage of a unit cell of a solid polymer electrolyte fuel cell.

We evaluated the output performance of a fuel cell by dipping said membrane/electrode assembly IX in deionized boiling water for 2 hours to let the assembly absorb water and setting the wet membrane/electrode assembly in a sample unit. FIG. 10 shows a relationship between current density and voltage of a unit cell of a fuel cell containing membrane/electrode assembly IX. The output voltage of the fuel cell is 0.63 V at a current density of 1 A/cm$^2$ and 0.80 V at a current density or 300 mA/cm$^2$. This fuel cell is fully available as a solid polymer electrolyte fuel cell.

Figure 11:
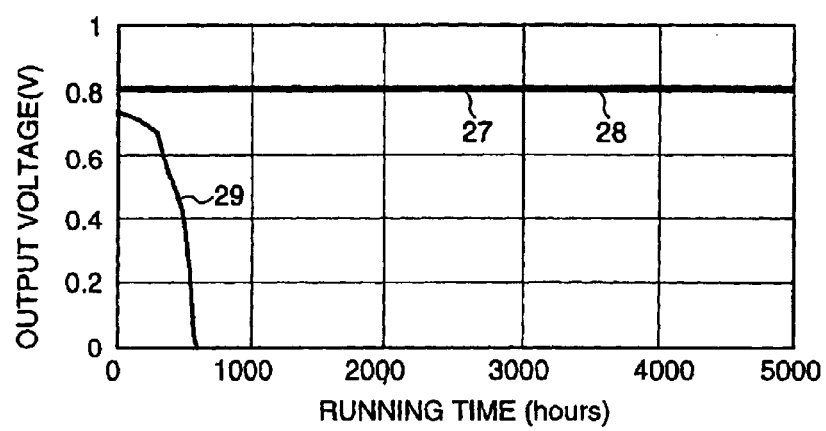
FIG. 11 shows the result of an endurance test of the unit cell of a solid polymer electrolyte fuel cell.

We ran the unit cell of said solid polymer electrolyte fuel cell for a long time at a current density of 300 mA/cm$^2$. FIG. 11 shows the relationship between the output voltage and the running time of the unit cell. The curve 27 in FIG. 11 is the result of the endurance test of the unit cell using the membrane/electrode assembly IX in accordance with the present invention. The curve 28 in FIG. 11 is the result of the endurance test of the unit cell using a perfluorosulfonic membrane/electrode assembly. As shown by curve 27 in FIG. 11, the output voltage of the unit cell is initially 0.80 V and keeps at the same voltage level even after the unit cell runs 5,000 hours, which is the same as the behavior of the output voltage of the unit cell using a perfluorosulfonic membrane (by curve 28). As shown by curve 29 in FIG. 11, the output voltage (of a unit cell using sulfonated aromatic hydrocarbon electrolyte of Comparative example 1 below) is initially 0.63 V but completely exhausted after the fuel cell runs 600 hours. Judging from these, it is apparent that the unit cell of a fuel cell using an aromatic hydrocarbon electrolyte having a sulfonic group bonded to the aromatic ring via an alkyl group is more durable than the unit cell of a fuel cell using an aromatic hydrocarbon electrolyte having a sulfonic group directly bonded to the aromatic ring.

(5) Preparation of Fuel Cells

Figure 3:
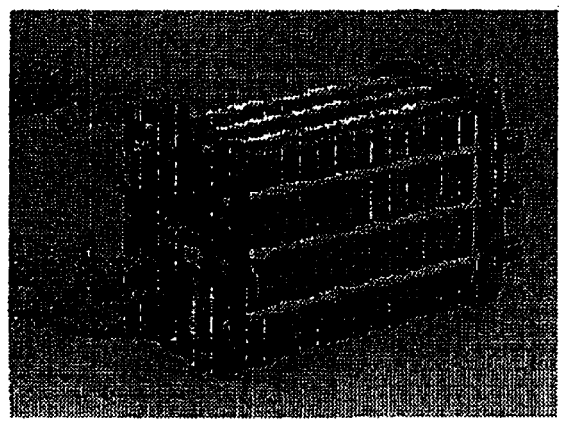
FIG. 3 is a picture showing the appearance of a 3 KW layer-built cell (stack) integrating the unit cells for a solid polymer electrolyte fuel cell.

We piled up 36 unit cells which were prepared in (4) to form a solid polymer electrolyte fuel cell as that shown in FIG. 3. This fuel cell outputs 3 KW.

[Embodiment 6]

(1) Preparation of Sulfopropylated Polysulfone

We prepared sulfopropylated polysulfone electrolyte by setting up a 500-ml 4-neck round bottom flask with a reflux condenser, a stirrer, a thermometer, and a desiccant tube (containing calcium chloride in it), substituting the air inside the flask by nitrogen gas, putting 22.1 g of polysulfone (PSU), 12.2 g (0.1 mol) of propanesultone and 50 ml of a dry solvent mixture of trichloroethane-dichloroethane (1:1), adding 14.7 g (0.11 mol) of aluminum chloride anhydride to the mixture gradually for 30 minutes while stirring thereof, keeping the mixture at 100° C. for 24 hours, dripping the reactant solution into 500 ml of iced water containing 25 ml of concentrated hydrochloric acid to stop the reaction, separating the organic precipitate, washing thereof, neutralizing thereof with an aqueous solution of sodium carbonate containing a few drops of octyl alcohol, separating aluminum hydroxide by filtration, decoloring the filtrate by active carbon, and evaporating the solvent. The ion exchange group equivalent weight of the obtained sulfopropylated polysulfone electrolyte is 750 g/mol.

The cost of the sulfopropylated sulfone electrolyte is one fiftieth or under of the cost of perfluorosulfonic electrolyte which is prepared from expensive material in five processes because the sulfopropylated sulfone electrolyte is prepared in a single process from poly-sulfone which is very cheap engineering plastics on-market.

We put 1.0 g of obtained sulfopropylated polysulfone and 20 ml of deionized Water in a TEFLON (polytetrafluoroethylene, trademark of Dupont)-coated hermetic stainless steel container, kept the container at 120° C. for 2 weeks, cooled the container and then measured the ion exchange group equivalent weight of the resulting sulfopropylated polysulfone electrolyte. As the result, we found that the ion exchange group equivalent weight of sulfopropylated sulfone remains unchanged (750 g/mol) and that sulfopropylated sulfone is as stable as the expensive perfluorosulfonic electrolyte. Contrarily as shown by the comparative example 5-(1) below, the cheap sulfonated aromatic hydrocarbon electrolyte is deteriorated under the same temperature and hydrolysis condition. Its ion exchange group equivalent increases up to 3,000 g/mol (which was initially 700 g/mol) and sulfone groups were dissociated. In other words, the low-cost sulfopropylated sulfone electrolyte unlike the cheap sulfonated aromatic hydrocarbon electrolyte (see Comparative example 5-(1)) shows very good chemical stability as well as the expensive perfluorosulfonic electrolyte, satisfying both low cost and high performance.

(2) Preparation of an Electrolyte Membrane

We prepared an electrolyte membrane by dissolving the sulfopropylated polysulfone electrolyte obtained by the above procedure (1) into a mixture of trichloroethane and dichloroethane (1:1) so that the solution may contain 5% by weight of the product, spreading this solution over a glass plate by spin-coating, air-drying thereof, and vacuum-drying thereof at 80° C. The obtained sulfopropylated polysulfone electrolyte membrane X is 42 $\mu$m thick.

We put said obtained sulfopropylated polysulfone electrolyte membrane X and 20 ml of deionized water in a TEFLON (polytetrafluoroethylene, trademark of Dupont)-coated hermetic stainless steel container, kept the container at 120° C. for 2 weeks, cooled the container and then measured its ion exchange group equivalent weight. As the result, we found that the ion exchange group equivalent weight of the obtained electrolyte membrane remains unchanged as well as the expensive perfluorosulfonic electrolyte. The membrane itself is tough enough. Contrarily as shown by the comparative example 5-(2), the comparatively cheap sulfonated aromatic hydrocarbon electrolyte XI is broken and ragged under the same temperature and hydrolysis condition. In other words, the low-cost sulfopropylated polysulfone electrolyte unlike the cheap sulfonated aromatic hydrocarbon electrolyte (see Comparative example 5-(2)) shows very good chemical stability as well as the expensive perfluorosulfonic electrolyte, satisfying both low cost and high performance.

(3) Preparation of a Solution for Covering Electrode Catalyst and a Membrane/Electrode Assembly We prepared a solution X for covering electrode catalyst by adding a solvent mixture of trichloroethane and dichloroethane (see (2)) to carbon carrying 40% by weight of platinum so that the ratio by weight of platinum catalyst and the polymer electrolyte might be 2:1, and dispersing the mixture uniformly. Next we prepared a membrane/electrode assembly X by coating both sides of the electrolyte membrane X (obtained by (2)) with said solution X for covering electrode catalyst, and drying thereof. The obtained membrane/electrode assembly X carries 0.25 mg/cm$^2$ of platinum.

We put said obtained membrane/electrode assembly X and 20 ml of deionized water in a TEFLON (polytetrafluoroethylene, trademark of Dupont)-coated hermetic stainless steel container and kept the container at 120° C. for 2 weeks. As the result, we found that the ion exchange group equivalent weight of the obtained electrolyte membrane remains unchanged as well as the membrane/electrode assembly prepared from the expensive perfluorosulfonic membrane and the perfluorosulfonic electrolyte. The membrane itself is tough enough.

Contrarily as shown by the comparative example 5-(3), the membrane/electrode assembly XI prepared by the comparatively cheap sulfonated aromatic hydrocarbon electrolyte XI and the electrode catalyst covering solution XI is broken and ragged under the same temperature and hydrolysis condition. In other words, the low-cost sulfopropylated sulfon membrane/electrode assembly unlike the cheap sulfonated aromatic hydrocarbon membrane/electrode assembly (see Comparative example 5-(3) is as stable as the expensive perfluorosulfonic membrane/electrolyte assembly, and satisfies both low cost and high performance.

(4) Evaluation of Output of the Unit Cells of a Fuel Cell

Figure 12:
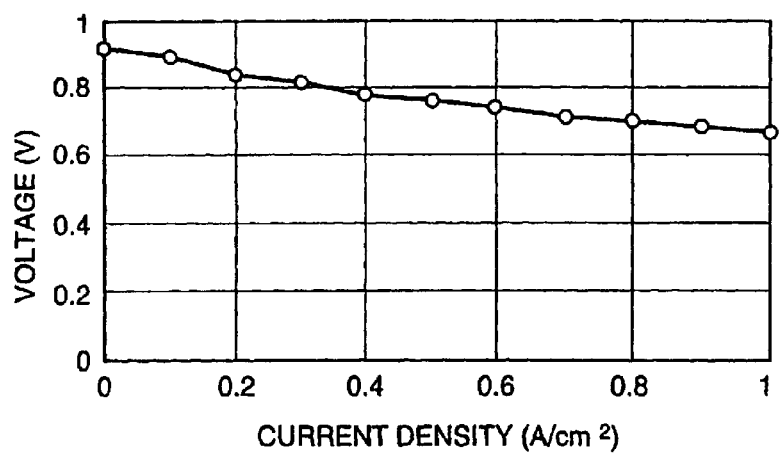
FIG. 12 shows a relationship between current density and output voltage of a unit cell of a solid polymer electrolyte fuel cell.

We evaluated the output performance of a fuel cell by dipping said membrane/electrode assembly X in deionized boiling water for 2 hours to let the assembly absorb water and setting the wet membrane/electrode assembly X in a sample unit. FIG. 12 shows a relationship between current density and voltage of a unit cell of a fuel cell containing membrane/electrode assembly XI. The output voltage of the fuel cell is 0.68 V at a current density of 1 A/cm$^2$ and 0.81 V at a current density or 300 mA/cm$^2$. This fuel cell is fully available as a solid polymer electrolyte fuel cell.

Figure 13:
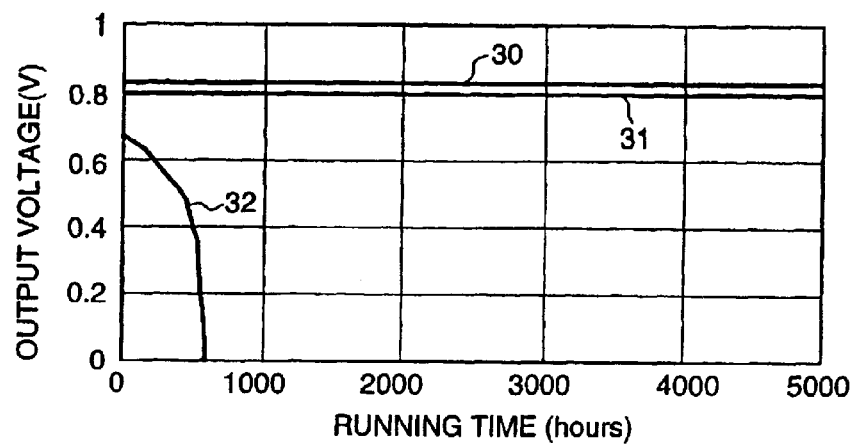
FIG. 13 shows the result of an endurance test of the unit cell of a solid polymer electrolyte fuel cell.

We ran the unit cell of said solid polymer electrolyte fuel cell for a long time at a current density of 300 mA/cm$^2$. FIG. 13 shows the relationship between the output voltage and the running time of the unit cell. The curve 30 in FIG. 13 is the result of the endurance test of the unit cell using the membrane/electrode assembly X in accordance with the present invention. The curve 31 in FIG. 13 is the result of the endurance test of the unit cell using a perfluorosulfonic membrane/electrode assembly. As shown by curve 30 in FIG. 13, the output voltage of the unit cell is initially 0.81 V and keeps at the same voltage level even after the unit cell runs 5,000 hours, which is the same as the behavior of the output voltage of the unit cell using a perfluorosulfonic membrane (by curve 31). As shown by curve 32 in FIG. 13, the output voltage (of a unit cell using sulfonated aromatic hydrocarbon electrolyte of Comparative example 5 below) is initially 0.63 V but completely exhausted after the fuel cell runs 600 hours. Judging from these, it is apparent that the unit cell of a fuel cell using an aromatic hydrocarbon electrolyte having a sulfonic group bonded to the aromatic ring via an alkyl group is more durable than the unit cell of a fuel cell using an aromatic hydrocarbon electrolyte having a sulfonic group directly bonded to the aromatic ring. Further, although both membrane/electrode assemblies of Embodiment 6 and Comparative example 5 carry 0.25 mg/cm$^2$ of platinum, the output voltage of Embodiment 6 is greater than the output voltage of Comparative example 5. This is because the ion conductivities of the electrolyte and the electrode catalyst covering solution in the membrane/electrode assembly of Embodiment 6 are greater than those of the electrolyte and the electrode catalyst covering solution in the membrane/electrode assembly of Comparative example 5 and because the membrane/electrode assembly of Embodiment 6 is superior to the membrane/electrode assembly of Comparative example 5.

(5) Preparation of Fuel Cells

We piled up 36 unit cells which were prepared in (5) to form a solid polymer electrolyte fuel cell as shown in FIG. 3. This fuel cell outputs 3 KW.

COMPARATIVE EXAMPLE 5

(1) Preparation of Sulfonated Poly-sulfone

We prepared sulfonated poly-sulfone by setting up a 500-ml 4-neck round bottom flask with a reflux condenser, a stirrer, a thermometer, and a desiccant tube (containing calcium chloride in it), substituting the air inside the flask by nitrogen gas, putting 25 g of poly-sulfone (PSU) and 125 ml of concentrated sulfuric acid in the flask, stirring the mixture at a room temperature for one night in the flow of nitrogen gas to make a uniform solution, dripping 48 ml of chlorosulfuric acid first slowly (because the chlorosulfuric acid vigorously reacts with water in the sulfuric acid with bubbles) by a dropping funnel into the uniform solution in the flow of nitrogen gas, completing dripping within 5 minutes after bubbling calms down, stirring the reactant solution at 25° C. for three and half hours to sulfonate thereof, dripping the reactant solution slowly into 15 liters of deionized water, filtering the deionized water to recover the precipitate (sulfonated poly-ethersulfone), repeating mixing the precipitate with deionized water and suction-filtering the mixture until the filtrate becomes neutral, and vacuum-drying the precipitate at 80° C. for one night. The ion exchange group equivalent weight of the obtained sulfonated poly-sulfone electrolyte is 700 g/mol.

We put 1.0 g of obtained sulfonated polysulfone electrolyte and 20 ml of deionized water in a TEFLON (polytetrafluoroethylene, trademark of Dupont)-coated hermetic stainless steel container, kept the container at 120° C. for 2 weeks, cooled the container and then measured the ion exchange group equivalent weight of sulfonated polysulfone. As the result, we found that the ion exchange group equivalent weight of sulfonated polysulfone electrolyte is 3,000 g/mol which is greater than the initial ion exchange group equivalent weight (700 g/mol). This means that the sulfonic groups are dissociated.

(2) Preparation of a Electrolyte Membrane

We prepared an electrolyte membrane XI by dissolving sulfonated polysulfone electrolyte obtained by the above procedure (1) into a mixture of 20 parts of N,N'-dimethylformamide, 80 parts of cyclohexanon, and 25 parts of methylethylketone so that the solution may contain 5% by weight of the product, spreading this solution over a glass plate by spin-coating, air-drying thereof, and vacuum-drying thereof at 80° C. The obtained electrolyte membrane XI is 45 μm thick and its ion exchange group equivalent is 0.02 S/cm.

We put said obtained electrolyte membrane XI and 20 ml of deionized water in a TEFLON (polytetrafluoroethylene, trademark of Dupont)-coated hermetic stainless steel container and kept the container at 120° C. for 2 weeks. As the result, we found the electrolyte membrane XI broken and ragged.

(3) Preparation of a Solution for Covering Electrode Catalyst and a Membrane/Electrode Assembly We prepared a solution XI for covering electrode catalyst by adding a solvent mixture of N,N'-dimethylformamide, cyclohexanon, and methylethylketone which contains 5% by weight of the product (see (2)) to carbon carrying 40% by weight of platinum so that the ratio by weight of platinum catalyst and the polymer electrolyte might be 2:1, and dispersing the mixture uniformly. Next we prepared a membrane/electrode assembly XI by coating both sides of the electrolyte membrane XI (obtained by (2)) with said solution XI for covering electrode catalyst, and drying thereof. The obtained membrane/electrode assembly XI carries 0.25 mg/cm$^2$ of platinum.

We put said obtained membrane/electrode assembly XI and 20 ml of deionized water in a TEFLON (polytetrafluoroethylene, trademark of Dupont)-coated hermetic stainless steel container, kept the container at 120° C. for 2 weeks, cooled the container and then inspected thereof. As the result, we found the membrane/electrode assembly XI broken and ragged.

(4) Endurance Test of Unit Cells of a Fuel Cell

We assembled the membrane/electrode assembly XI of Comparative example 5, thin carbon-paper packing materials (as supporting current collectors) at both sides of the assembly, and conductive separators (bipolar plates) provided at outer sides thereof and also working to separate the electrodes from the chamber and to flow gases to the electrodes into a unit cell for a solid polymer electrolyte fuel cell, and ran the unit cell for a long time at a current density of 300 mA/cm$^2$. As the result, the output voltage of the unit cell was initially 0.68V but exhausted after a 600-hours run, as shown by the curve 32 in FIG. 13.

[Embodiment 7]

(1) Preparation of Sulfo-propylated Polysulfone

We prepared sulfo-propylated poly-sulfone electrolyte by setting up a 500-ml 4-neck round bottom flask with a reflux condenser, a stirrer, a thermometer, and a desiccant tube (containing calcium chloride in it), substituting the air inside the flask by nitrogen gas, putting 22.1 g of polysulfone (PSU), 12.2 g (0.1 mol) of propane-sulfone and 50 ml of dry nitrobenzene, adding 14.7 g (0.11 mol) of aluminum chloride anhydride to the mixture gradually for 30 minutes while stirring thereof, then refluxing for 24 hours, dripping the reactant solution into 500 ml of iced water containing 25 ml of concentrated hydrochloric acid to stop the reaction, separating the organic precipitate, washing thereof, neutralizing thereof with an aqueous solution of sodium carbonate containing a few drops of octyl alcohol, separating aluminum hydroxide by filtration, decoloring the filtrate by active carbon, and evaporating the solvent. The ion exchange group equivalent weight of the obtained sulfo-propylated polysulfone electrolyte is 660 g/mol.

The cost of the sulfo-propylated sulfone electrolyte is one fiftieth or under of the cost of perfluoro-sulfonic electrolyte which is prepared from expensive material in five processes because the sulfo-propylated sulfone electrolyte is prepared in a single process from poly-sulfone which is very cheap engineering plastics on-market.

We put 1.0 g of obtained sulfo-propylated polysulfone and 20 ml of deionized water in a TEFLON (polytetrafluoroethylene, trademark of Dupont)-coated hermetic stainless steel container, kept the container at 120° C. for 2 weeks, cooled the container and then measured the ion exchange group equivalent weight of the resulting sulfo-propylated polysulfone electrolyte. As the result, we found that the ion exchange group equivalent weight of sulfo-propylated sulfone remains unchanged (660 g/mol) and that sulfo-propylated sulfone is as stable as the expensive perfluoro-sulfonic electrolyte. Contrarily as shown by the comparative example 5-(1) below, the cheap sulfonated aromatic hydrocarbon electrolyte is deteriorated under the same temperature and hydrolysis condition. Its ion exchange group equivalent increases up to 3,000 g/mol (which was initially 700 g/mol) and sulfone groups were dissociated. In other words, the low-cost sulfo-propylated sulfone electrolyte unlike the cheap sulfonated aromatic hydrocarbon electrolyte (see Comparative example 5-(1)) shows very good chemical stability as well as the expensive perfluoro-sulfonic electrolyte, satisfying both low cost and high performance.

(2) Preparation of an Electrolyte Membrane

We prepared an electrolyte membrane by dissolving the product obtained by the above procedure (1) into a mixture of trichloroethane and dichloroethane (1:1) so that the solution may contain 5% by weight of the product, spreading this solution over a glass plate by spin-coating, air-drying thereof, and vacuum-drying thereof at 80° C. The obtained sulfo-propylated poly-sulfone electrolyte membrane X is 38 $\mu$m thick.

We put said obtained sulfo-propylated poly-sulfone electrolyte membrane X and 20 ml of deionized water in a TEFLON (polytetrafluoroethylene, trademark of Dupont)-coated hermetic stainless steel container, kept the container at 120° C. for 2 weeks, cooled the container and then measured its ion exchange group equivalent weight. As the result, we found that the ion exchange group equivalent weight of the obtained electrolyte membrane remains unchanged as well as the expensive perfluoro-sulfonic electrolyte. The membrane itself is tough enough. Contrarily as shown by the comparative example 5-(2), the comparatively cheap sulfonated aromatic hydrocarbon electrolyte X1 is broken and ragged under the same temperature and hydrolysis condition. In other words, the low-cost sulfo-propylated poly-sulfone electrolyte unlike the cheap sulfonated aromatic hydrocarbon electrolyte (see Comparative example 5-(2)) shows very good chemical stability as well as the expensive perfluoro-sulfonic electrolyte, satisfying both low cost and high performance.

We prepared a solution for covering electrode catalyst by adding a solvent mixture of trichloro-ethane and dichloro-ethane (see (2)) to carbon carrying 40% by weight of platinum so that the ratio by weight of platinum catalyst and the polymer electrolyte might be 2:1, and dispersing the mixture uniformly. Next we prepared a membrane/electrode assembly by coating both sides of the electrolyte membrane (obtained by (2)) with said solution for covering electrode catalyst, and drying thereof. The obtained membrane/electrode assembly carries 0.25 mg/cm$^2$ of platinum.

We put said obtained membrane/electrode assembly and 20 ml of deionized water in a TEFLON (polytetrafluoroethylene, trademark of Dupont)-coated hermetic stainless steel container and kept the container at 120° C. for 2 weeks. As the result, we found that the ion exchange group equivalent weight of the obtained electrolyte membrane remains unchanged as well as the membrane/electrode assembly prepared from the expensive perfluoro-sulfonic membrane and the perfluoro-sulfonic electrolyte. The membrane itself is tough enough.

Contrarily as shown by the comparative example 5-(3), the membrane/electrode assembly prepared by the comparatively cheap sulfonated aromatic hydrocarbon electrolyte and the electrode catalyst covering solution is broken and ragged under the same temperature and hydrolysis condition. In other words, the low-cost sulfo-propylated sulfon membrane/electrode assembly unlike the cheap sulfonated aromatic hydrocarbon membrane/electrode assembly (see Comparative example 5-(3)) is as stable as the expensive perfluoro-sulfonic membrane/electrolyte assembly, and satisfies both low cost and high performance.

(4) Evaluation of Output of the Unit Cells of a Fuel Cell

Figure 14:
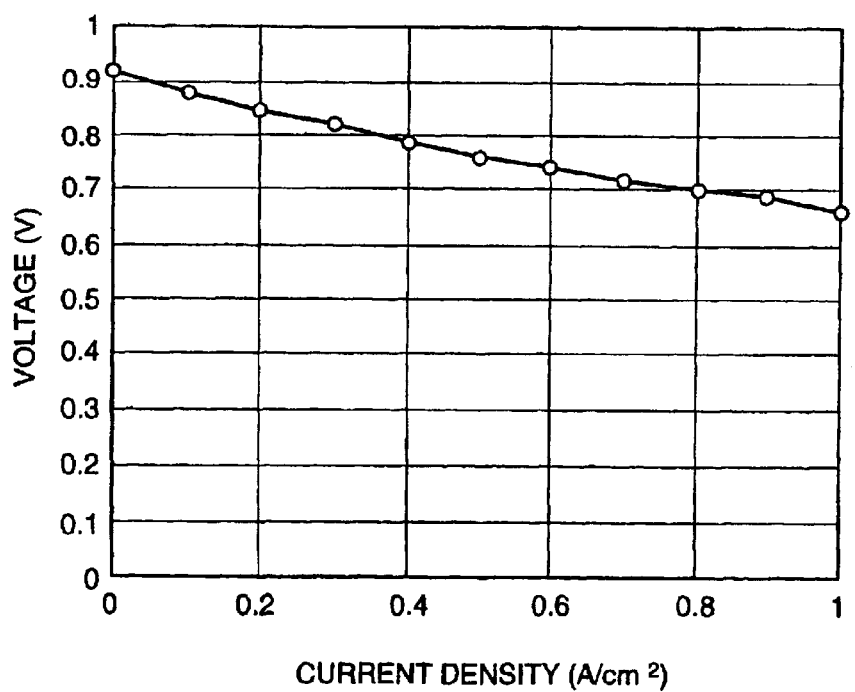
FIG. 14 shows a relationship between current density and output voltage of a unit cell of a solid polymer electrolyte fuel cell.

We evaluated the output performance of a fuel cell by dipping said membrane/electrode assembly in deionized boiling water for 2 hours to let the assembly absorb water and setting the wet membrane/electrode assembly in a sample unit. FIG. 14 shows a relationship between current density and voltage of a unit cell of a fuel cell containing membrane/electrode assembly. The output voltage of the fuel cell is 0.75 V at a current density of 1 A/cm$^2$ and 0.83 V at a current density or 300 mA/cm$^2$. This fuel cell is fully available as a solid polymer electrolyte fuel cell.

Figure 15:
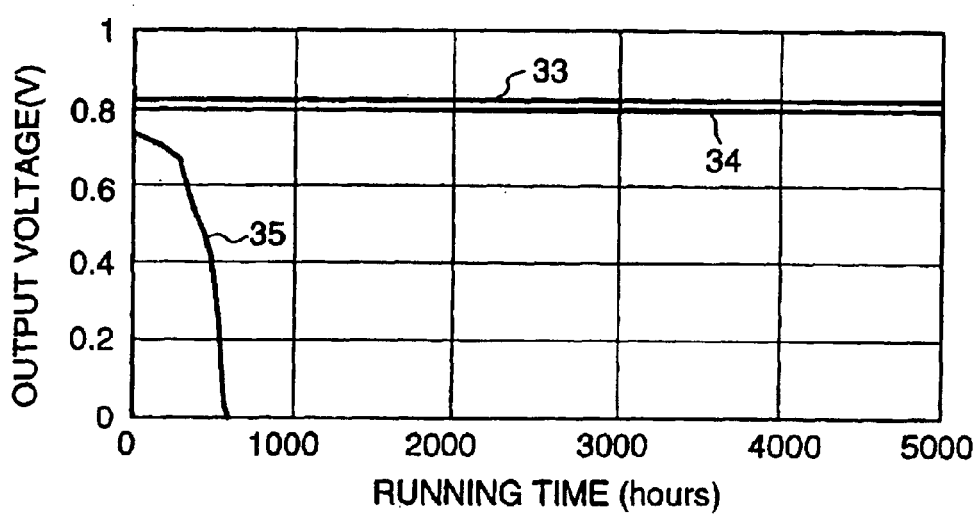
FIG. 15 shows the result of an endurance test of the unit cell of a solid polymer electrolyte fuel cell.

We ran the unit cell of said solid polymer electrolyte fuel cell for a long time at a current density of 300 mA/cm². FIG. 15 shows the relationship between the output voltage and the running time of the unit cell. The curve 33 in FIG. 15 is the result of the endurance test of the unit cell using the membrane/electrode assembly in accordance with the present invention. The curve 34 in FIG. 15 is the result of the endurance test of the unit cell using a perfluoro-sulfonic membrane/electrode assembly. As shown by curve 33 in FIG. 15, the output voltage of the unit cell is initially 0.83 V and keeps at the same voltage level even after the unit cell runs 5,000 hours, which is the same as the behavior of the output voltage of the unit cell using a perfluoro-sulfonic membrane (by curve 34). As shown by curve 35 in FIG. 15, the output voltage (of a unit cell using sulfonated aromatic hydrocarbon electrolyte of Comparative example 5 below) is initially 0.63 V but completely exhausted after the fuel cell runs 600 hours. Judging from these, it is apparent that the unit cell of a fuel cell using an aromatic hydrocarbon electrolyte having a sulfonic group bonded to the aromatic ring via an alkyl group is more durable than the unit cell of a fuel cell using an aromatic hydrocarbon electrolyte having a sulfonic group directly bonded to the aromatic ring. Further, although both membrane/electrode assemblies of Embodiment 7 and Comparative example 5 carry 0.25 mg/cm² of platinum, the output voltage of Embodiment 7 is greater than the output voltage of Comparative example 5. This is because the ion conductivities of the electrolyte and the electrode catalyst covering solution in the membrane/electrode assembly of Embodiment 7 are greater than those of the electrolyte and the electrode catalyst covering solution in the membrane/electrode assembly of Comparative example 5 and because the membrane/electrode assembly of Embodiment 7 is superior to the membrane/electrode assembly of Comparative example 5.

(6) Preparation of Fuel Cells

We piled up 36 unit cells which were prepared in (5) to form a solid polymer electrolyte fuel cell as shown in FIG. 3. This fuel cell outputs 3 KW.

[Embodiment 8 to Embodiment 13]

We prepared sulfo-alkylated aromatic hydrocarbon electrolyte by setting up a 600-ml 4-neck round bottom flask with a reflux condenser, a stirrer, a thermometer, and a desiccant tube (containing calcium chloride in it), substituting the air inside the flask by nitrogen gas, putting an aromatic hydrocarbon polymer, a sultone, and 50 ml of dry nitrobenzene in the flask, adding 14.7 g (0.11 mol) of aluminum chloride anhydride to the mixture gradually for 30 minutes while stirring thereof, refluxing the mixture at a preset temperature for a preset time period after addition of aluminum chloride anhydride is completed, pouring the reactant into 150 ml of iced water containing 25 ml of concentrated hydrochloric acid to stop the reaction, dripping the reactant solution slowly into 0.5 liter of deionized water, filtering the deionized water to recover the precipitate (sulfo-alkylated aromatic hydrocarbon), repeating mixing the precipitate with deionized water and suction-filtering the mixture until the filtrate becomes neutral, and vacuum-drying the precipitate at 120° C. for one night. We measured and evaluated the water resistance, and deterioration of the electrolyte and the membrane/electrode assembly, and performance of the unit cell of a fuel cell made thereof. Table 1 shows the result of evaluation and measurement. The cost of the sulfo-alkylated aromatic hydrocarbon electrolyte is one fortieth or under of the cost of perfluoro-sulfonic electrolyte which is prepared from expensive material in five processes because the sulfo-alkylated aromatic hydrocarbon electrolyte is prepared in a single process from very cheap engineering plastics on-market. We put respective sulfo-alkylated aromatic hydrocarbon electrolytes of Embodiment 8 to Embodiment 13 and deionized water in a TEFLON (polytetrafluoroethylene, trademark of Dupont)-coated hermetic stainless steel container, kept each container at 120° C. for 2 weeks, and measured the ion exchange group equivalent weight of each sulfo-alkylated aromatic hydrocarbon electrolytes. As the result, we found that each of sulfo-alkylated aromatic hydrocarbon electrolytes unlike the cheap sulfonated aromatic hydrocarbon of Comparative example 1 keeps its initial value and is as stable as the expensive perfluoro-sulfonic electrolyte, satisfying the low cost and high performance. We put respective sulfo-alkylated aromatic hydrocarbon electrolytes of Embodiment 8 to Embodiment 13 and deionized water in a TEFLON (polytetrafluoroethylene, trademark of Dupont)-coated hermetic stainless steel container, kept each container at 120° C. for 2 weeks, and measured the ion exchange group equivalent weight of each sulfo-alkylated aromatic hydrocarbon electrolytes. As the result, we found that each of sulfo-alkylated aromatic hydrocarbon electrolytes unlike the cheap sulfonated aromatic hydrocarbon of Comparative example 1 keeps its original shape and is as stable as the expensive perfluoro-sulfonic electrolyte, satisfying the low cost and high performance. We put respective sulfo-alkylated aromatic hydrocarbon membrane/electrode assemblies of Embodiment 8 to Embodiment 13 and deionized water in a TEFLON (polytetrafluoroethylene, trademark of Dupont)-coated hermetic stainless steel container and kept each container at 120° C. for 2 weeks. We found that each of the sulfo-alkylated aromatic hydrocarbon membrane/electrode assemblies unlike the sulfonated aromatic hydrocarbon of Comparative example 1 keeps its original property and is as stable as the expensive perfluoro-sulfonic membrane/electrode assembly, satisfying the low cost and high performance. Further after running respective unit cells at 300 mA/cm² for 5,000 hours, we found that the output of respective unit cells using sulfo-alkylated aromatic hydrocarbon electrolytes unlike the output of a unit cell using the sulfonated aromatic hydrocarbon electrolyte of Comparative example 1 keeps the initial output voltage and is as stable as the unit cell using the expensive perfluoro-sulfonic electrolyte, satisfying the low cost and high performance.

TABLE 1

|  | Embodiment 8 | Embodiment 9 | Embodiment 10 | Embodiment 11 | Embodiment 12 | Embodiment 13 |
| --- | --- | --- | --- | --- | --- | --- |
| Aromatic hydrocarbon polymer (g) | Poly-allyl-etherketone (14.0) | Poly-ketone (12.0) | Poly-etherketone (15.0) | Poly-ethersulfone (20.0) | Poly-ethersulfone (5.0) | Poly-ether sulfone (11.6) |

TABLE 1-continued

|  | Embodiment 8 | Embodiment 9 | Embodiment 10 | Embodiment 11 | Embodiment 12 | Embodiment 13 |
|---|---|---|---|---|---|---|
| Sultone (g) | Propane-sultone (12.2) | Propane-sultone (12.2) | Propane-sultone (12.2) | Propane-sultone (12.2) | Propane-sultone (25.5) | Butane-sultone (13.6) |
| Temperature of reaction (° C.) | 150 | 150 | 150 | 150 | 150 | 150 |
| Time of reaction (hr) | 12 | 12 | 12 | 5 | 30 | 30 |
| Ion exchange group equivalent weight (g/mol) | 620 | 610 | 680 | 1000 | 250 | 680 |
| Ion exchange group equivalent weight of electrolyte after dipping in deionized water at 120° C. for 2 weeks (g/mol) | 620 | 610 | 680 | 1000 | 250 | 680 |
| Ion exchange group equivalent weight of membrane after dipping in deionized water at 120° C. for 2 weeks | No change | No change | No change | No change | No change | No change |
| Ion exchange group equivalent weight of membrane/electrode assembly after dipping in deionized water at 120° C. for 2 weeks | No change | No change | No change | No change | No change | No change |
| Initial output of unit cell (V at 1A/cm$^2$) | 0.65 | 0.66 | 0.65 | 0.6 | 0.69 | 0.65 |
| Output of unit cell after running at 300 mA/cm$^2$ for 5,000 hours (ratio to the initial voltage in percentage) | 97 | 98 | 96 | 97 | 96 | 95 |

[Embodiment 14]
(1) Preparation of Chloromethylated Poly-ether Sulfone

We prepared chloromethylated poly-ether sulfone by setting up a 500-ml 4-neck round bottom flask with a reflux condenser, a stirrer, a thermometer, and a desiccant tube (containing calcium chloride in it), substituting the air inside the flask by nitrogen gas, putting 21.6 g of poly-ether sulfone (PES), 60 g (2 moles) of paraformaldehyde and 50 ml of dry nitro benzene, blowing 73 g of hydrogen chloride gas while stirring at 100° C., keeping the mixture at 150° C., dripping the reactant solution slowly into 1 liter of deionized water, letting chloromethylated poly-ether sulfone deposit, filtrating and recovering the precipitate repeating mixing the precipitate with deionized water and suction-filtering the mixture until the filtrate becomes neutral, and vacuum-drying the precipitate at 80° C. for one night.

(2) Preparation of Sulfo-methylated Poly-ether Sulfone.

We prepared sulfo-methylated poly-ether sulfone by setting up a 500-ml 4-neck round bottom flask with a reflux condenser, a stirrer, a thermometer, and a desiccant tube (containing calcium chloride in it), substituting the air inside the flask by nitrogen gas, putting 10 g of chloro-methylated poly-ether sulfone, 50 ml of dry nitro benzene, and 30 g of sodium sulfate, stirring the mixture at 100° C. for 5 hours, adding 10 ml of deionized water, stirring the solution for five hours, dripping a reactant solution slowly into 1 liter of deionized water, letting sulfo-methylated poly-ether sulfone deposit, filtrating and recovering the precipitate repeating mixing the precipitate with deionized water and suction-filtering the mixture until the filtrate becomes neutral, and vacuum-drying the precipitate at 120° C. for one night. The ion exchange group equivalent weight of the resulting sulfo-methylated poly-ether sulfone electrolyte is 600 g/mol.

As the sulfo-methylated poly-ether sulfone electrolyte in accordance with the present invention can be produced in two processes from poly-poly-ether-sulfone which is inexpensive engineering plastics on-market, the cost of the sulfo-methylated poly-ether sulfone electrolyte is one thirtieth or under of the perfluorosulfonic electrolyte which is produced in five processes from expensive materials. However, the method of producing the sulfoalkylated poly-ether sulfone electrolyte by sulfoalkylating poly-poly-ether-sulfone directly by sulfone (as in Embodiment 1) has one process less than the method of Embodiment 14. Therefore the cost of the sulfoalkylated poly-ether sulfone electrolyte is two third of the cost of product obtained by the method of Embodiment 14. Namely, the method of sulfoalkylating sulfoalkylating poly-poly-ether-sulfone directly by sulfone is lower-costed.

We put 1.0 g of the obtained sulfo-methylated poly-ether sulfone electrolyte and 20 ml of deionized water in a TEFLON (polytetrafluoroethylene, trademark of Dupont)-coated hermetic stainless steel container, kept the container at 120° C. for 2 weeks, cooled the container and then measured the ion exchange group equivalent weight of sulfo-methylated poly-ether sulfone electrolyte. As the result, we found that the ion exchange group equivalent weight of the sulfopropylated polyether sulfone electrolyte remains unchanged (600 g/mol) and that sulfopropylated polyether sulfone is as stable as the expensive perfluorosulfonic electrolyte. Contrarily as shown by the Comparative example 1-(1) below, the cheap sulfonated aromatic hydrocarbon electrolyte is deteriorated under the same temperature and hydrolysis condition. Its ion exchange group equivalent increases up to 3,000 g/mol (which was initially 960 g/mol) and sulfone groups were dissociated. In other words, the low-cost sulfo-methylated poly-ether sulfone electrolyte unlike the cheap sulfonated aromatic hydrocarbon electrolyte shows very good chemical stability as well as the expensive perfluorosulfonic electrolyte, satisfying both low cost and high performance.

(3) Preparation of an Electrolyte Membrane

We prepared an electrolyte membrane by dissolving the sulfo-methylated poly-ether-sulfone electrolyte obtained by the above procedure (2) into a mixture of trichloroethane and dichloroethane (1:1) so that the solution may contain 5% by weight of the product, spreading this solution over a glass plate by spin-coating, air-drying thereof, and vacuum-drying thereof at 80° C. The obtained sulfo-methylated poly-ether-sulfone electrolyte membrane is 42 $\mu$m thick.

We put said obtained sulfo-methylated poly-ether-sulfone electrolyte membrane and 20 ml of deionized water in a TEFLON (polytetrafluoroethylene, trademark of Dupont)-coated hermetic stainless steel container and kept the container at 120° C. for 2 weeks. As the result, we found that the ion exchange group equivalent weight of the obtained electrolyte membrane remains unchanged as well as the expensive perfluoro-sulfonic electrolyte. The membrane itself is tough enough. Contrarily as shown by the comparative example 1-(2), the comparatively cheap sulfonated aromatic hydrocarbon electrolyte is broken and ragged under the same temperature and hydrolysis condition. In other words, the low-cost sulfo-methylated poly-ether-sulfone electrolyte unlike the cheap sulfonated aromatic hydrocarbon electrolyte shows very good chemical stability as well as the expensive perfluoro-sulfonic electrolyte, satisfying both low cost and high performance.

(4) Preparation of a Solution for Covering Electrode Catalyst and a Membrane/Electrode Assembly We prepared a paste (solution for covering electrode catalyst) by adding a solvent mixture of trichloroethane and di-chloro-ethane (see (3)) to carbon carrying 40% by weight of platinum so that the ratio by weight of platinum catalyst and the polymer electrolyte might be 2:1, and dispersing the mixture uniformly. Next we prepared a membrane/electrode assembly by coating both sides of the electrolyte membrane (obtained by (2)) with said solution for covering electrode catalyst, and drying thereof. The obtained membrane/electrode assembly carries 0.25 mg/cm$^2$ of platinum.

We put the obtained membrane/electrode assembly and 20 ml of deionized water in a TEFLON (polytetrafluoroethylene, trademark of Dupont)-coated hermetic stainless steel container and kept the container at 120° C. for 2 weeks. As the result, we found that the property of the membrane/electrode assembly keeps its initial property as well as the expensive perfluoro-sulfonic membrane/electrode assembly prepared by the expensive perfluoro-sulfonic membrane and the perfluoro-sulfonic electrolyte. Its membrane is tough enough. Contrarily as shown by the comparative example 1(3), the membrane/electrode assembly prepared by the comparatively cheap sulfonated aromatic hydrocarbon electrolyte membrane II and the electrode catalyst covering solution II is deteriorated under the same temperature and hydrolysis condition. The electrodes are separated from the assembly. In other words, the low-cost sulfomethylated polyether sulfone membrane/electrode assembly unlike the cheap sulfonated aromatic hydrocarbon membrane/electrode assembly (see Comparative example 1-(3)) shows very good chemical stability as well as the expensive perfluoro-sulfonic electrolyte, satisfying both low cost and high performance.

(5) Evaluation of Output of the Unit Cells of a Fuel Cell

Figure 16:
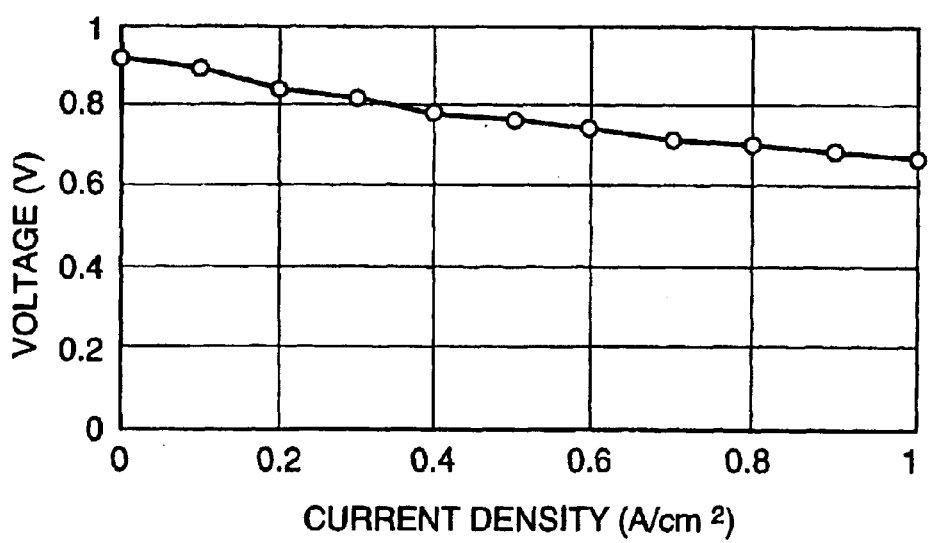
FIG. 16 shows a relationship between current density and output voltage of a unit cell of a solid polymer electrolyte fuel cell.

We evaluated the output performance of a fuel cell by dipping said membrane/electrode assembly in deionized boiling water for 2 hours to let the assembly absorb water and setting the wet membrane/electrode assembly in a sample unit. FIG. 16 shows a relationship between current density and voltage of a unit cell of a fuel cell containing membrane/electrode assembly. The output voltage of the fuel cell is 0.68 V at a current density of 1 A/cm$^2$ and 0.82 V at a current density or 300 mA/cm$^2$. This fuel cell is fully available as a solid polymer electrolyte fuel cell.

Figure 17:
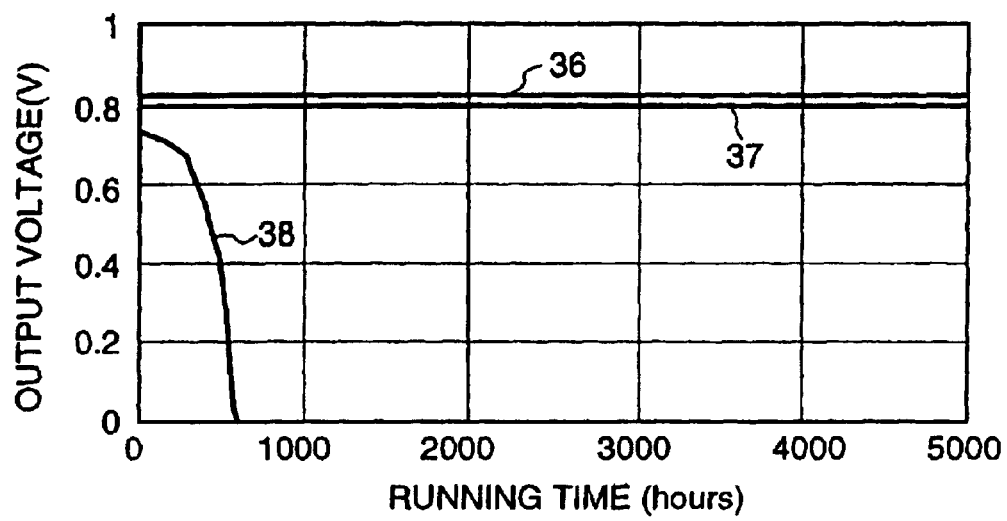
FIG. 17 shows the result of an endurance test of the unit cell of a solid polymer electrolyte fuel cell.

We ran the unit cell of said solid polymer electrolyte fuel cell for a long time at a current density of 300 mA/cm$^2$. FIG. 17 shows the relationship between the output voltage and the running time of the unit cell. The curve 36 in FIG. 17 is the result of the endurance test of the unit cell using the membrane/electrode assembly in accordance with the present invention. The curve 37 in FIG. 17 is the result of the endurance test of the unit cell using a perfluoro-sulfonic membrane/electrode assembly. As shown by curve 36 in FIG. 17, the output voltage of the unit cell is initially 0.82 V and keeps at the same voltage level even after the unit cell runs 5,000 hours, which is the same as the behavior of the output voltage of the unit cell using a perfluoro-sulfonic membrane (by curve 37). As shown by curve 38 in FIG. 17, the output voltage (of a unit cell using sulfonated aromatic hydrocarbon electrolyte of Comparative example) is initially 0.73 V but completely exhausted after the fuel cell runs 600 hours. Judging from these, it is apparent that the unit cell of a fuel cell using an aromatic hydrocarbon electrolyte having a sulfonic group bonded to the aromatic ring via an alkyl group is more durable than the unit cell of a fuel cell using an aromatic hydrocarbon electrolyte having a sulfonic group directly bonded to the aromatic ring. Further, although both membrane/electrode assemblies of Embodiment 14 and Comparative example 1 carry 0.25 mg/cm$^2$ of platinum, the output voltage of Embodiment 14 is greater than the output voltage of Comparative example 4. This is because the ion conductivities of the electrolyte and the electrode catalyst covering solution in the membrane/electrode assembly of Embodiment 14 are greater than those of the electrolyte and the electrode catalyst covering solution in the membrane/electrode assembly of Comparative example 1 and because the membrane/electrode assembly of Embodiment 14 is superior to the membrane/electrode assembly of Comparative example 1.

(6) Preparation of Fuel Cells

We piled up 36 unit cells which were prepared in (5) to form a solid polymer electrolyte fuel cell as that shown in FIG. 3. This fuel cell outputs 3 KW.

[Embodiment 15]

(1) Preparation of Bromo-hexamethylated Poly-ether Sulfone

We prepared bromo-hexamethylated poly-ether sulfone by setting up a 500-ml 4-neck round bottom flask with a reflux condenser, a stirrer, a thermometer, and a desiccant tube (containing calcium chloride in it), substituting the air inside the flask by nitrogen gas, putting 23.2 g of polyether sulfone (PES) and 50 ml of dry nitrobenzene in the flask, adding 6.5 g of butoxylithium to the mixture, keeping the mixture at the room temperature for 2 hours, adding 100 g of 1,6-dibromohexane to the mixture, stirring thereof for 12 hours, dripping the reactant solution slowly into 1 liter of deionized water, filtering the deionized water to recover the precipitate (bromo-hexamethylated poly-ether sulfone), repeating mixing the precipitate with deionized water and suction-filtering the mixture until the filtrate becomes neutral, and vacuum-drying the precipitate at 120° C. for one night.

(2) Preparation of Sulfo-hexamethylated Poly-ether Sulfone

We prepared sulfo-hexamethylated poly-ether sulfone by setting up a 500-ml 4-neck round bottom flask with a reflux condenser, a stirrer, a thermometer, and a desiccant tube (containing calcium chloride in it), substituting the air inside the flask by nitrogen gas, putting 10 g of bromo-hexamethylated poly-ether sulfone, 50 ml of dry nitrobenzene, and 30 g of sodium sulfate in the flask, stirring the mixture at 100° C. for 5 hours, adding 10 ml of deionized water to the mixture, stirring the mixture for 5 hours, dripping the reactant solution slowly into 1 liter of deionized water, filtering the deionized water to recover the precipitate (sulfo-hexamethylated poly-ether sulfone), repeating mixing the precipitate with deionized water and suction-filtering the mixture until the filtrate becomes neutral, and vacuum-drying the precipitate at 120° C. for one night. The ion exchange group equivalent weight of the obtained sulfo-hexamethylated poly-ether sulfone is 600 g/mol.

The cost of the sulfoalkylated poly-ether sulfone electrolyte in the present method is one thirtieth or under of the cost of perfluoro-sulfonic electrolyte which is prepared from expensive materials in five processes because the sulfoalkylated poly-ether sulfone electrolyte is prepared in a two processes from poly-poly-ether-sulfone which is very cheap engineering plastics on-market. However, the method of producing the sulfoalkylated poly-ether sulfone electrolyte by sulfoalkylating poly-poly-ether-sulfone directly by sultone (as in Embodiment 1) has one process less than the method of Embodiment 14. Therefore the cost of the sulfoalkylated poly-ether sulfone electrolyte is two third of the cost of product obtained by the method of Embodiment 14. Namely, the method of sulfoalkylating poly-poly-ether-sulfone directly by sultone has a lower cost.

We put 1.0 g of the obtained sulfo-hexamethylated poly-ether sulfone electrolyte and 20 ml of deionized water in a TEFLON (polytetrafluoroethylene, trademark of Dupont)-coated hermetic stainless steel container, kept the container at 120° C. for 2 weeks, cooled the container and then measured the ion exchange group equivalent weight of sulfo-hexamethylated poly-ether sulfone electrolyte. As the result, we found that the ion exchange group equivalent weight of the sulfo-hexamethylated polyether sulfone electrolyte remains unchanged (600 g/mol) and that sulfopropylated polyether sulfone is as stable as the expensive perfluorosulfonic electrolyte. Contrarily as shown by the Comparative example 1-(1) below, the cheap sulfonated aromatic hydrocarbon electrolyte is deteriorated under the same temperature and hydrolysis condition. Its ion exchange group equivalent increases up to 3,000 g/mol (which was initially 960 g/mol) and sulfone groups were dissociated. In other words, the low-cost sulfo-hexamethylated poly-ether sulfone electrolyte unlike the cheap sulfonated aromatic hydrocarbon electrolyte shows very good chemical stability as well as the expensive perfluorosulfonic electrolyte, satisfying both low cost and high performance.

(3) Preparation of an Electrolyte Membrane

We prepared an electrolyte membrane by dissolving the product obtained in the above procedure (2) into a mixture of 20 parts of N,N'-dimethylformamide, 80 parts of cyclohexanon, and 25 parts of methylethylketone so that the solution may contain 5% by weight of the product, spreading this solution over a glass plate by spin-coating, air-drying thereof, and vacuum-drying thereof at 80° C. The obtained sulfo-hexamethylated poly-ether sulfone electrolyte membrane is 42 μm thick and its ion exchange group equivalent is 8 S/cm.

We put the obtained sulfo-hexamethylated poly-ether sulfone electrolyte membrane and 20 ml of deionized water in a TEFLON (polytetrafluoroethylene, trademark of Dupont)-coated hermetic stainless steel container and kept the container at 120° C. for 2 weeks. As the result, we found that the ion exchange group equivalent weight of the product remains unchanged and is as stable as the expensive perfluoro-sulfonic electrolyte. Its membrane is tough enough. Contrarily as shown by the comparative example 1-(2) below, the cheap sulfonated aromatic hexamethylated polyether sulfone electrolyte remains unchanged (600 g/mol) and that sulfopropylated polyether sulfone is as stable as the expensive perfluorosulfonic electrolyte. Contrarily as shown by the Comparative example 1-(1) below, the cheap sulfonated aromatic hydrocarbon electrolyte is deteriorated under the same temperature and hydrolysis condition. Its ion exchange group equivalent increases up to 3,000 g/mol (which was initially 960 g/mol) and sulfone groups were dissociated. In other words, the low-cost sulfo-hexamethylated poly-ether sulfone electrolyte unlike the cheap sulfonated aromatic hydrocarbon electrolyte shows very good chemical stability as well as the expensive perfluorosulfonic electrolyte, satisfying both low cost and high performance.

(4) Preparation of an Electrolyte Membrane

We prepared a paste (an electrolyte catalyst covering solution) by dissolving the product (3) into a mixture of trichloroethane and dichloroethane, adding this mixture to carbon carrying 40% by weight of platinum so that the weight ration of platinum catalyst and polymer electrolyte may be 2:1, and dispersing thereof uniformly. Next we prepared a membrane/electrode assembly by coating both sides of the electrolyte membrane (obtained by (3)) with said electrode covering solution, and drying thereof. The obtained membrane/electrode assembly carries 0.25 mg/cm² of platinum.

We put the obtained sulfo-hexamethylated poly-ether sulfone electrolyte membrane and 20 ml of deionized water in a TEFLON (polytetrafluoroethylene, trademark of Dupont)-coated hermetic stainless steel container and kept the container at 120° C. for 2 weeks. As the result, we found that the resulting membrane/electrode assembly remains unchanged and is as stable as the membrane/electrode assembly made from the expensive perfluoro-sulfonic membrane and the perfluoro-sulfonic electrolyte. Its membrane is tough enough. Contrarily as shown by the comparative example 1-(3) below, the cheap sulfonated aromatic hydrocarbon electrolyte II prepared by the comparatively cheap sulfonated aromatic hydrocarbon electrolyte membrane II and the electrolyte catalyst covering solution II is broken and ragged under the same temperature and hydrolysis conditions and the electrodes are separated from the assembly. In other words, the low-cost sulfo-hexamethylated poly-ether sulfone membrane/electrode assembly unlike the cheap sulfonated aromatic hydrocarbon electrolyte (see Comparative example 1-(3)) shows very good chemical stability as well as the expensive perfluoro-sulfonic membrane/electrode assembly, satisfying both low cost and high performance. electrodes are separated from the assembly. In other words, the low-cost sulfo-hexametylated poly-ether sulfone membrane/electrode assembly unlike the cheap sulfonated aromatic hydrocarbon electrolyte (see Comparative example I-(3)) shows very good chemical stability as well as the expensive perfluoro-sulfonic membrane/electrode assembly, satisfying both low cost and high performance.

(5) Evaluation of Output of the Unit Cells of a Fuel Cell

Figure 18:
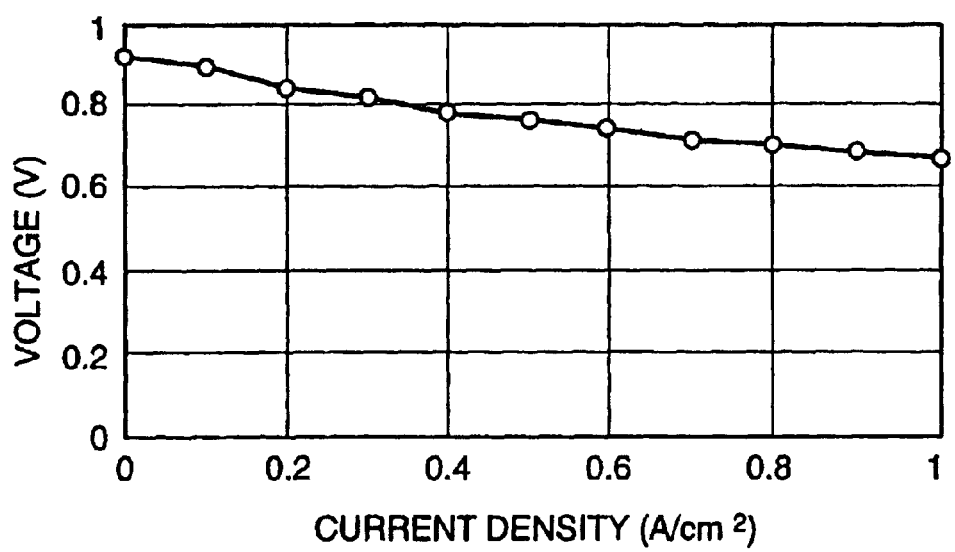
FIG. 18 shows a relationship between current density and output voltage of a unit cell of a solid polymer electrolyte fuel cell.

We evaluated the output performance of a fuel cell by dipping said membrane/electrode assembly in deionized boiling water for 2 hours to let the assembly absorb water and setting the wet membrane/electrode assembly in a sample unit. FIG. 18 shows a relationship between current density and voltage of a unit cell of a fuel cell containing membrane/electrode assembly. The output voltage of the fuel cell is 0.68 V at a current density of 1 A/cm$^2$ and 0.83 V at a current density or 300 mA/cm$^2$. This fuel cell is fully available as a solid polymer electrolyte fuel cell.

Figure 19:
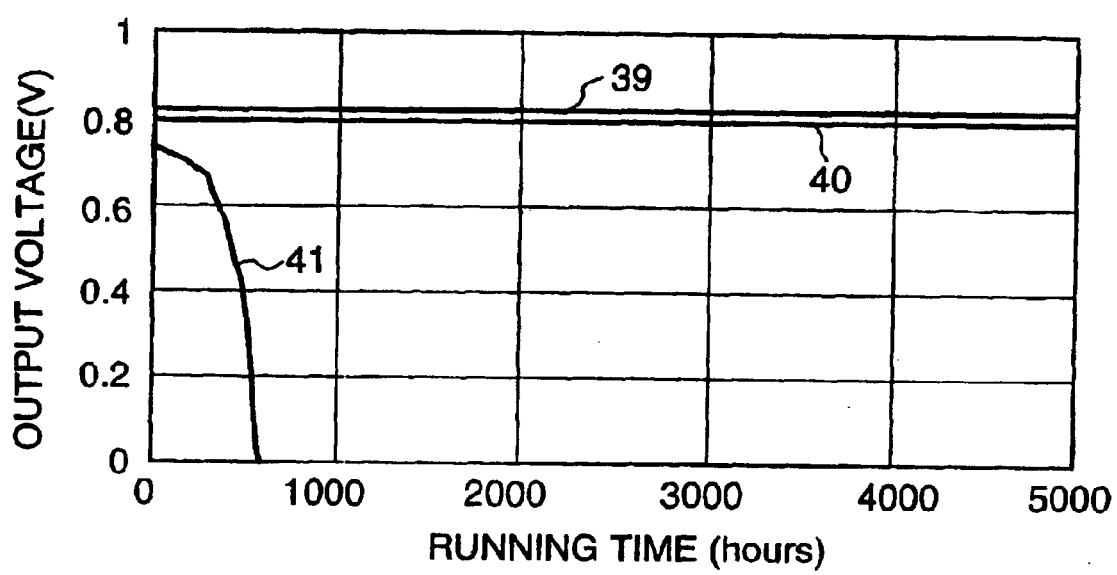
FIG. 19 shows the result of an endurance test of the unit cell of a solid polymer electrolyte fuel cell.

We ran the unit cell of said solid polymer electrolyte fuel cell for a long time at a current density of 300 mA/cm$^2$. FIG. 19 shows the relationship between the output voltage and the running time of the unit cell. The curve 39 in FIG. 19 is the result of the endurance test of the unit cell using the membrane/electrode assembly in accordance with the present invention. The curve 40 in FIG. 19 is the result of the endurance test of the unit cell using a perfluoro-sulfonic membrane/electrode assembly. As shown by curve 39 in FIG. 19, the output voltage of the unit cell is initially 0.83 V and keeps at the same voltage level even after the unit cell runs 5,000 hours, which is the same as the behavior of the output voltage of the unit cell using a perfluoro-sulfonic membrane (by curve 40). As shown by curve 41 in FIG. 19, the output voltage (of a unit cell using sulfonated aromatic hydrocarbon electrolyte of Comparative example 1) is initially 0.73 V but completely exhausted after the fuel cell runs 600 hours. Judging from these, it is apparent that the unit cell of a fuel cell using an aromatic hydrocarbon electrolyte having a sulfonic group bonded to the aromatic ring via an alkyl group is more durable than the unit cell of a fuel cell using an aromatic hydrocarbon electrolyte having a sulfonic group directly bonded to the aromatic ring. Further, although both membrane/electrode assemblies of Embodiment 15 and Comparative example 1 carry 0.25 mg/cm$^2$ of platinum, the output voltage of Embodiment 15 is greater than the output voltage of Comparative example 4. This is because the ion conductivities of the electrolyte and the electrode catalyst covering solution in the membrane/electrode assembly of Embodiment 15 are greater than those of the electrolyte and the electrode catalyst covering solution in the membrane/electrode assembly of Comparative example 1 and because the membrane/electrode assembly of Embodiment 15 is superior to the membrane/electrode assembly of Comparative example 1.

(6) Preparation of Fuel Cells

We piled up 36 unit cells which were prepared in (5) to form a solid polymer electrolyte fuel cell as that shown in FIG. 3. This fuel cell outputs 3 KW.

Effect of the Invention

The sulfoalkylated aromatic hydrocarbon electrolyte in accordance with the present invention can be produced in a single process from low-cost engineering plastics and its cost is one fortieth or under of a fluorine electrolyte membrane represented by a perfluoro-sulfonic membrane which is produced in five processes from expensive materials. Further due to the bonding of a sulfonic group to a benzene ring via an alkyl group unlike the direct bonding of a sulfonic group to a benzene ring, the ion conductivity of the sulfoalkylated aromatic hydrocarbon electrolyte is great, suppresses sulfonic groups from being dissociated at a high temperature in the presence of a strong acid, and shows a substantially high chemical durability. Therefore, electrolyte membranes, electrolyte catalyst covering solutions, membrane/electrode assemblies, and fuel cells using the sulfoalkylated aromatic hydrocarbon electrolyte in accordance with the present invention show a substantially high chemical durability and can reduce steps of production.

What is claimed is:

1. A membrane/electrode assembly for a solid polymer electrolyte fuel cell comprising:

a polymer electrolyte membrane and an electrode unit comprising
    a cathode and an anode, which are placed one on each side of said polymer electrolyte membrane, wherein said polymer electrolyte membrane contains a solid polymer electrolyte, each of the electrodes of the electrode unit comprises a conductive material made of carbon and having fine catalytic metal particles bound to the surface thereof with a binder made of said solid polymer electrolyte, and said solid polymer electrolyte comprising a polymer compound having a hydrocarbon aromatic group in the backbone thereof and including a side chain expressed by FORMULA 1:

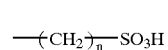

FORMULA 1 wherein "n" is 1, 2, 3, 4, 5, or 6.

2. The membrane/electrode assembly of claim 1, wherein said polymer compound is a poly-ether sulfonic polymer.

3. The membrane/electrode assembly of claim 1, wherein said polymer compound is a poly-ether ether ketone polymer.

4. The membrane/electrode assembly of claim 1, wherein said polymer compound is a poly-phenylene sulfide polymer.

5. The membrane/electrode assembly of claim 1, wherein said polymer compound is a poly-phenylene ether polymer.

6. The membrane/electrode assembly of claim 1, wherein said polymer compound is a poly sulfonic polymer.

7. The membrane/electrode assembly of claim 1, wherein said polymer compound is a poly-ether ketone polymer.

8. A solid polymer electrolyte fuel cell comprising:

a solid polymer electrolyte membrane, an electrode unit comprising a cathode and an anode, which are placed one on each side of said polymer electrolyte membrane, a pair of separators, which are provided to surround said electrode unit, and a pair of current collecting members, which are placed between said electrode unit and said separator, wherein said solid polymer electrolyte membrane contains a solid polymer electrolyte, which comprises a polymer compound having a hydrocarbon aromatic group in the backbone thereof and including a side chain expressed by FORMULA 1:

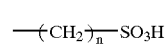

FORMULA 1 wherein "n" is 1, 2, 3, 4, 5, or 6.

9. The solid polymer electrolyte fuel cell of claim 8, wherein said polymer compound is a poly-ether sulfonic polymer.

10. The solid polymer electrolyte fuel cell of claim 8, wherein said polymer compound is a poly-ether ether ketone polymer.

11. The solid polymer electrolyte fuel cell of claim 8, wherein said polymer compound is a poly-phenylene sulfide polymer.

12. The solid polymer electrolyte fuel cell of claim 8, wherein said polymer compound is a poly-phenylene ether polymer.

13. The solid polymer electrolyte fuel cell of claim 8, wherein said polymer compound is a poly sulfonic polymer.

14. The solid polymer electrolyte fuel cell of claim 8, wherein said polymer compound is a poly-ether ketone polymer.

15. A membrane containing a solid polymer electrolyte in accordance with any one of claims 1 and 8.

16. A binder solution for coating fine catalytic metal particles onto the surface of a conductive material made of carbon, wherein said binder solution contains a solid polymer electrolyte in accordance with any one of claims 1 and 8.

17. A solid polymer electrolyte fuel cell comprising:

a polymer electrolyte membrane, an electrode unit comprising a cathode and an anode, which are placed one on each side of said polymer electrolyte membrane, a pair of separators, which are provided to surround said electrode unit, and a pair of current collecting members, which are placed between said electrode unit and said separator, wherein said solid polymer electrolyte membrane and said electrode unit together make up the membrane/electrode assembly in accordance with claim 1.

* * * * *